(12) United States Patent
Katsura et al.

(10) Patent No.: US 12,469,157 B2
(45) Date of Patent: Nov. 11, 2025

(54) FILLING RATE MEASUREMENT METHOD, INFORMATION PROCESSING DEVICE, AND RECORDING MEDIUM

(71) Applicant: Panasonic Intellectual Property Management Co., Ltd., Osaka (JP)

(72) Inventors: Ukyou Katsura, Osaka (JP); Toru Matsunobu, Osaka (JP); Toshiyasu Sugio, Osaka (JP); Tomokazu Ichiriki, Kanagawa (JP); Masanori Kimura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 419 days.

(21) Appl. No.: 17/967,066

(22) Filed: Oct. 17, 2022

(65) Prior Publication Data

US 2023/0035883 A1 Feb. 2, 2023

Related U.S. Application Data

(63) Continuation of application No. PCT/JP2021/015149, filed on Apr. 12, 2021.

(30) Foreign Application Priority Data

Apr. 28, 2020 (JP) ................. 2020-079081

(51) Int. Cl.
*G06T 7/60* (2017.01)
*G06V 10/46* (2022.01)
*G06V 20/64* (2022.01)

(52) U.S. Cl.
CPC .............. *G06T 7/60* (2013.01); *G06V 10/469* (2022.01); *G06V 20/64* (2022.01)

(58) Field of Classification Search
CPC ... G06T 7/60; G06T 2207/10012; G06T 7/62; G06T 2207/10024; G06T 2207/30112;
(Continued)

(56) References Cited

U.S. PATENT DOCUMENTS 9,940,730 B2 * 4/2018 Zhang ..................... G06T 7/50
11,308,314 B2 * 4/2022 Hashimoto ............ G06V 40/20
(Continued)

FOREIGN PATENT DOCUMENTS

JP   2009053147 A  *  3/2009  ........... G06T 7/0006
JP   4492654 B2  *  6/2010  ............. G06T 7/593
(Continued)

OTHER PUBLICATIONS

International Search Report (ISR) issued on Jul. 6, 2021 in International (PCT) Application No. PCT/JP2021/015149.

*Primary Examiner* — Van D Huynh
*Assistant Examiner* — Benedict E Lee
(74) *Attorney, Agent, or Firm* — Wenderoth, Lind & Ponack, L.L.P.

(57) ABSTRACT

A filling rate measurement method includes: obtaining a space three-dimensional model generated by measuring a first storage having an opening and a first storage space in which a measurement target is to be stored, the measuring being performed using a range sensor facing the first storage; obtaining a storage three-dimensional model that is a three-dimensional model of the first storage in which the measurement target is not stored; extracting a target portion corresponding to the measurement target from the space three-dimensional model using the space three-dimensional model and the storage three-dimensional model; calculating a first three-dimensional coordinate system; estimating a target three-dimensional model using the target portion and the first three-dimensional coordinate system, the target (Continued)

three-dimensional model being a three-dimensional model of the measurement target in the first storage space; and calculating a first filling rate of the measurement target with respect to the first storage space.

11 Claims, 27 Drawing Sheets

(58) Field of Classification Search
CPC ...... G06V 10/46; G06V 10/469; G06V 20/64; G01B 11/25; G01B 11/2513; G01B 11/00; G01B 11/24
See application file for complete search history.

(56) References Cited

U.S. PATENT DOCUMENTS

| | | | |
|---|---|---|---|
| 11,481,093 B1* | 10/2022 | Diaz | G01V 5/22 |
| 12,039,488 B2* | 7/2024 | Marquette | G06V 20/64 |
| 2020/0096623 A1* | 3/2020 | Okada | G01S 7/497 |
| 2020/0302237 A1* | 9/2020 | Hennings Yeomans | G06V 20/56 |
| 2021/0289161 A1* | 9/2021 | Huang | G06T 7/75 |
| 2021/0326593 A1* | 10/2021 | Bonsignore | G01S 17/89 |
| 2021/0357896 A1* | 11/2021 | Masuda | G06T 7/20 |
| 2022/0180560 A1* | 6/2022 | Nakano | G06T 3/40 |

FOREIGN PATENT DOCUMENTS

| | | | | |
|---|---|---|---|---|
| JP | 2014035702 A | * | 2/2014 | G01B 11/00 |
| JP | 2015-87319 | | 5/2015 | |
| JP | 2017067704 A | * | 4/2017 | |
| KR | 102093042 B1 | * | 3/2020 | G01F 23/14 |
| WO | 2017/175312 | | 10/2017 | |
| WO | WO-2017175312 A1 | * | 10/2017 | B65G 1/137 |
| WO | WO-2019012687 A1 | * | 1/2019 | G01S 17/08 |

* cited by examiner (a)

(b)

(c)

| ID | Filling rate |
|---|---|
| 200 | 70% |
| 201 | 30% |
| 202 | 20% |

# FILLING RATE MEASUREMENT METHOD, INFORMATION PROCESSING DEVICE, AND RECORDING MEDIUM

CROSS REFERENCE TO RELATED APPLICATIONS

This is a continuation application of PCT International Application No. PCT/JP2021/015149 filed on Apr. 12, 2021, designating the United States of America, which is based on and claims priority of Japanese Patent Application No. 2020-079081 filed on Apr. 28, 2020. The entire disclosures of the above-identified applications, including the specifications, drawings and claims are incorporated herein by reference in their entirety.

FIELD

The present disclosure relates to a filling rate measurement method, an information processing device, and a recording medium.

BACKGROUND

Patent Literature (PTL) 1 discloses a three-dimensional shape measuring device that obtains a three-dimensional shape using a three-dimensional laser scanner.

CITATION LIST

Patent Literature

PTL 1: Japanese Unexamined Patent Application Publication No. 2015-87319

SUMMARY

Technical Problem

There are no sufficient discussions about examples of application of measured three-dimensional shapes. For example, there are no sufficient discussions about calculation of a filling rate that indicates how many measurement targets are stored in a prescribed storage space.

The present disclosure provides a filling rate measurement method capable of calculating a filling rate of a measurement target, and the like.

Solution to Problem

In accordance with an aspect of the present disclosure, a filling rate measurement method includes: obtaining a space three-dimensional model generated by measuring a first storage having an opening and a first storage space in which a measurement target is to be stored, the measuring being performed through the opening using a range sensor facing the first storage; obtaining a storage three-dimensional model that is a three-dimensional model of the first storage in which the measurement target is not stored; extracting a target portion corresponding to the measurement target from the space three-dimensional model using the space three-dimensional model obtained and the storage three-dimensional model obtained; calculating a first three-dimensional coordinate system based on only a shape of a part of the first storage; estimating a target three-dimensional model using the target portion extracted and the first three-dimensional coordinate system calculated, the target three-dimensional model being a three-dimensional model of the measurement target in the first storage space; and calculating a first filling rate of the measurement target with respect to the first storage space, using the storage three-dimensional model and the target three-dimensional model.

In accordance with another aspect of the present disclosure, an information processing device includes: a processor; and a memory, wherein, using the memory, the processor: obtains a space three-dimensional model generated by measuring a first storage having an opening and a first storage space in which a measurement target is to be stored, the measuring being performed through the opening using a range sensor facing the first storage; obtains a storage three-dimensional model that is a three-dimensional model of the first storage in which the measurement target is not stored; extracts a target portion corresponding to the measurement target from the space three-dimensional model using the space three-dimensional model obtained and the storage three-dimensional model obtained; calculates a first three-dimensional coordinate system based on only a shape of a part of the first storage; estimates a target three-dimensional model using the target portion extracted and the first three-dimensional coordinate system calculated, the target three-dimensional model being a three-dimensional model of the measurement target in the first storage space; and calculates a first filling rate of the measurement target with respect to the first storage space, using the storage three-dimensional model and the target three-dimensional model.

It should be noted that the present disclosure may be implemented to a program that causes a computer to execute the steps included in the above-described filing rate measurement method. Furthermore, the present disclosure may be implemented to a non-transitory computer-readable recording medium, such as a Compact Disc-Read Only Memory (CD-ROM), on which the program is recorded. The present disclosure may be implemented to information, data, or signals indicating the program. The program, the information, the data, and the signals may be distributed via a communication network, such as the Internet.

Advantageous Effects

According to the present disclosure, a filling rate measurement method capable of calculating a filling rate of a measurement target, and the like can be provided.

BRIEF DESCRIPTION OF DRAWINGS

These and other advantages and features will become apparent from the following description thereof taken in conjunction with the accompanying Drawings, by way of non-limiting examples of embodiments disclosed herein.

Figure 1:
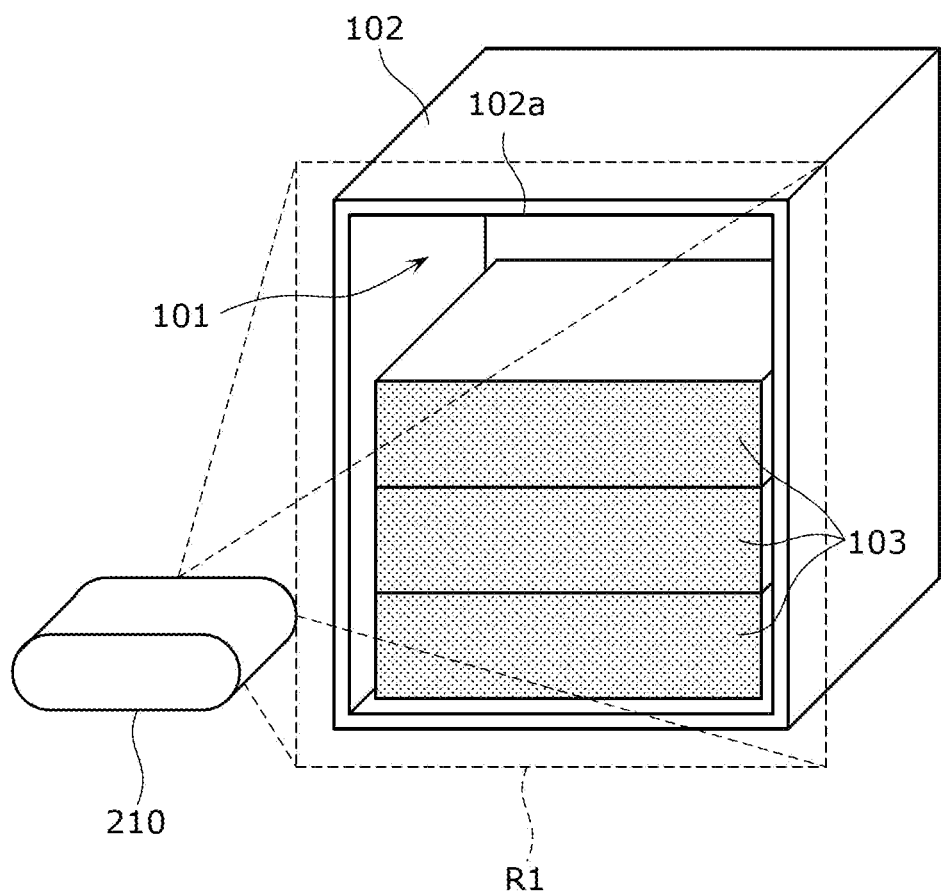
FIG. 1 is a diagram for describing an outline of a filling rate measurement method according to an embodiment.

DESCRIPTION OF EMBODIMENT (Circumstances Leading to the Present Disclosure)

There is a demand for measuring a filling rate of a measurement target such as baggage with respect to a storage space to improve an efficiency of use of the storage space in a distribution site. Further, since measurement targets are to be stored in many storages such as containers in a distribution site, there is a demand for measuring as many filling rates in a short time as possible. However, there are no sufficient discussions about a method for measuring a filling rate easily.

Therefore, the present disclosure provides a filling rate measurement method for easily calculating as many filling rates of storages in a short time as possible by applying a technique of generating a three-dimensional model to a storage in which a measurement target is stored.

In accordance with an aspect of the present disclosure, a filling rate measurement method includes: obtaining a space three-dimensional model generated by measuring a first storage having an opening and a first storage space in which a measurement target is to be stored, the measuring being performed through the opening using a range sensor facing the first storage; obtaining a storage three-dimensional model that is a three-dimensional model of the first storage in which the measurement target is not stored; extracting a target portion corresponding to the measurement target from the space three-dimensional model using the space three-dimensional model obtained and the storage three-dimensional model obtained; estimating a target three-dimensional model using the target portion extracted, the target three-dimensional model being a three-dimensional model of the measurement target in the first storage space; and calculating a first filling rate of the measurement target with respect to the first storage space, using the storage three-dimensional model and the target three-dimensional model.

According to this aspect, a target three-dimensional model of a measurement target is estimated using a target portion that is extracted using a space three-dimensional model resulting from measuring a first storage in a state where the measurement target is stored and a storage three-dimensional model of the first storage in which the measurement target is not stored. Therefore, the first filling rate of the measurement target with respect to the first storage space can be calculated easily only by measuring the first storage in a state where the measurement target is stored.

Furthermore, it is possible that the estimating of the target three-dimensional model is performed, based on a first three-dimensional coordinate system based on a shape of a part of the first storage.

Therefore, a processing amount of estimation of the target three-dimensional model can be reduced.

Furthermore, it is possible that the filling rate measurement method further includes: calculating the first three-dimensional coordinate system based on only the shape of the part of the first storage.

This enables the shape of only the part of the first storage, which is easy to extract on an image, to be used for calculation of the first three-dimensional coordinate system. Therefore, a processing speed of the estimation of the target three-dimensional model can be improved, and a precision of calculating the first three-dimensional coordinate system can be improved.

Furthermore, it is possible that the shape of the part of the first storage is a shape of the opening.

Therefore, the coordinate system based on the shape of the opening can be calculated easily, and the target three-dimensional model can be estimated based on the calculated coordinate system.

Furthermore, it is possible that the estimating of the target three-dimensional model is performed, based on a first three-dimensional coordinate system based on a position of a marker provided to the first storage.

Therefore, the coordinate system based on the marker can be calculated easily, and the target three-dimensional model can be estimated based on the calculated coordinate system.

Furthermore, it is possible that the estimating of the target three-dimensional model is performed by estimating a shape of a second portion of the measurement target which does not face the range sensor in a direction from the range sensor toward the measurement target, based on a shape of a first portion of the measurement target which faces the range sensor in the direction.

Therefore, even in a case where the second portion through which the range sensor does not face the measurement target is present, the target three-dimensional model can be estimated.

Furthermore, it is possible that the first storage further includes a cover part including a through hole, the cover part being opened and closed, and covering the opening when the cover part is in a closed state, the first portion faces, in the direction, the through hole of the cover part in the closed state, the second portion is hidden in the direction by the cover part in the closed state, the filling rate measurement method further includes determining whether the cover part is in an open state or the closed state, when the cover part is in the open state, the extracting and the estimating of the target three-dimensional model are performed to estimate the target three-dimensional model, and when the cover part is in the closed state, the second portion is estimated based on the first portion, and the target three-dimensional model is estimated using the first portion, the second portion estimated, and the storage three-dimensional model.

According to this, even in a case where the measurement target is stored in the first storage provided with the cover part that opens and closes the opening, the method for estimating the target three-dimensional model is switched according to the open/closed state of the cover part, and thus the target three-dimensional model can be estimated appropriately.

Furthermore, it is possible that the direction is horizontal. This eliminates a need to adjust a position of the range sensor so that measurement can be performed in a direction in which the cover part having through holes is not present, and thus a flexibility of placing the range sensor is high. Therefore, a result of measurement for estimating the target three-dimensional model by the range sensor can be obtained even when the position of the range sensor is not adjusted completely.

Furthermore, it is possible that the calculating of the first filling rate is performed by calculating, as the first filling rate, a proportion of a volume of the measurement target stored in the first storage space to a capacity of an available space for storing the measurement target in the first storage space.

Therefore, the first filling rate for appropriately determining how many measurement targets can be stored in a vacant space of the first storage space can be calculated.

Furthermore, it is possible that the first storage and an additional first storage are stored in a second storage space included in a second storage, and the filling rate measurement method further includes calculating a second filling rate of the first storage and the additional first storage with respect to the second storage space.

This enables the second filling rate in a case where one or more first storages are stored in the second storage space to be calculated appropriately.

Furthermore, it is possible that the storage three-dimensional model is a three-dimensional model measured by the range sensor and an additional range sensor.

Therefore, a storage three-dimensional model with little occlusion can be generated.

Furthermore, it is possible that the range sensor includes at least two cameras for generating the space three-dimensional model and is fixed to a position above the first storage.

In a case where the range sensor is fixed above the first storage in this manner, objects imaged by the two cameras of the range sensor are limited to the ground or a mount (bottom face) of the first storage, and there is no movable object other than the first storage, which makes it easy to separate the measurement target from a background.

In accordance with another aspect of the present disclosure, an information processing device includes: a processor; and a memory, wherein, using the memory, the processor: obtains a space three-dimensional model generated by measuring a first storage having an opening and a first storage space in which a measurement target is to be stored, the measuring being performed through the opening using a range sensor facing the first storage; obtains a storage three-dimensional model that is a three-dimensional model of the first storage in which the measurement target is not stored; extracts a target portion corresponding to the measurement target from the space three-dimensional model using the space three-dimensional model obtained and the storage three-dimensional model obtained; estimates a target three-dimensional model using the target portion extracted, the target three-dimensional model being a three-dimensional model of the measurement target in the first storage space; and calculates a first filling rate of the measurement target with respect to the first storage space, using the storage three-dimensional model and the target three-dimensional model.

According to this aspect, a target three-dimensional model of a measurement target is estimated using a target portion that is extracted using a space three-dimensional model resulting from measuring a first storage in a state where the measurement target is stored and a storage three-dimensional model of the first storage in which the measurement target is not stored. Therefore, the first filling rate of the measurement target with respect to the first storage space can be calculated easily only by measuring the first storage in a state where the measurement target is stored.

It should be noted that the present disclosure may be implemented to a program that causes a computer to execute the steps included in the above-described filing rate measurement method. Furthermore, the present disclosure may be implemented to a non-transitory computer-readable recording medium, such as a Compact Disc-Read Only Memory (CD-ROM), on which the program is recorded. The present disclosure may be implemented to information, data, or signals indicating the program. The program, the information, the data, and the signals may be distributed via a communication network, such as the Internet.

Hereinafter, exemplary embodiments of the filing rate measurement method and the like according to the present disclosure will be described in detail with reference to the accompanying Drawings. The following embodiments are examples of the present disclosure. The numerical values, shapes, materials, elements, arrangement and connection configuration of the elements, steps, the order of the steps, etc., described in the following embodiments are merely examples, and are not intended to limit the present disclosure.

It should be noted that the respective figures are schematic diagrams and are not necessarily precise illustrations. Additionally, components that are essentially the same share like reference signs in the figures. Accordingly, overlapping explanations thereof are omitted or simplified.

EMBODIMENT

With reference to FIG. 1, an outline of a filing rate measurement method according to an embodiment will be described.

FIG. 1 is a diagram for describing the outline of the filing rate measurement method according to the embodiment.

In the filling rate measurement method, as illustrated in FIG. 1, baggage 103 stored in rack 102 that includes storage space 101 is measured with range sensor 210. Then, using results of measurement obtained, a filling rate of baggage 103 with respect to storage space 101 is calculated. Rack 102 is formed with opening 102a through which baggage 103 is put into or taken out from storage space 101. Range sensor 210 is disposed at a location facing opening 102a of rack 102 in an orientation that allows range sensor 210 to measure rack 102 having opening 102a and measures measurement region R1, which contains an inside of storage space 101, through opening 102a.

Rack 102 has, for example, a box shape as illustrated in FIG. 1. The rack need not have a box shape as long as the rack has a configuration in which the rack includes a placement surface on which baggage 103 is placed and includes, over the placement surface, storage space 101 where baggage 103 is stored. Rack 102 is an example of a first storage. Storage space 101 is an example of a first storage space. Although storage space 101 is configured to be an internal space included in rack 102, storage space 101 is not limited to the internal space and may be a space in a storehouse where measurement targets such as baggage 103 are stored. Baggage 103 is an example of the measurement targets. The measurement targets are not limited to baggage 103 and may be goods. That is, the measurement targets may be any bodies as long as they are transportable.

Figure 2:
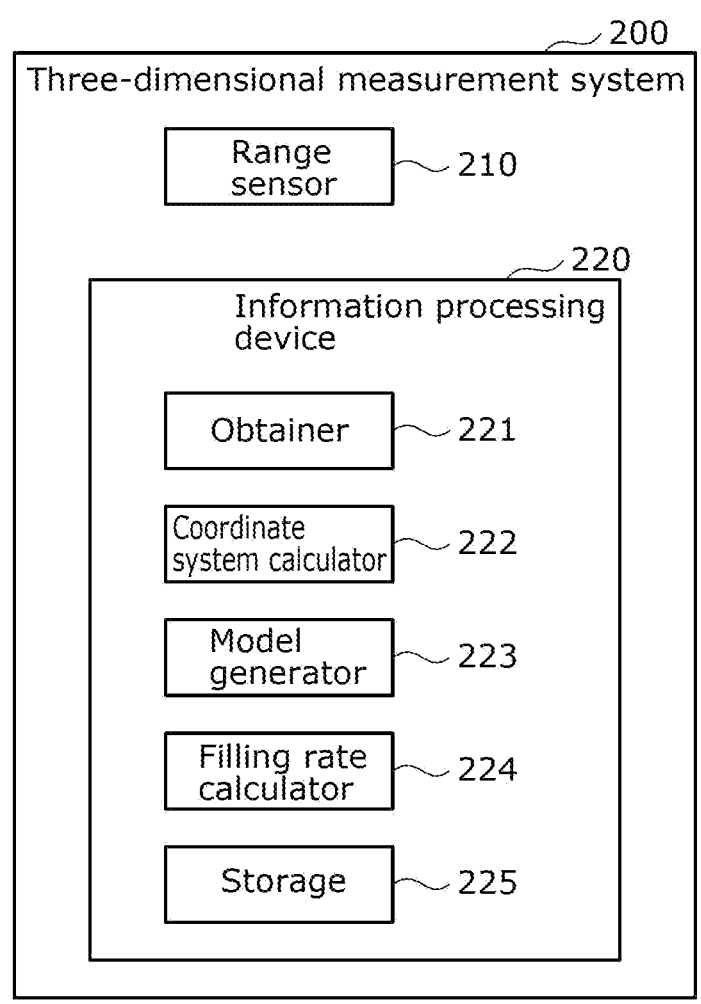
FIG. 2 is a block diagram illustrating a characteristic configuration of a three-dimensional measurement system according to the embodiment.
Figure 3:
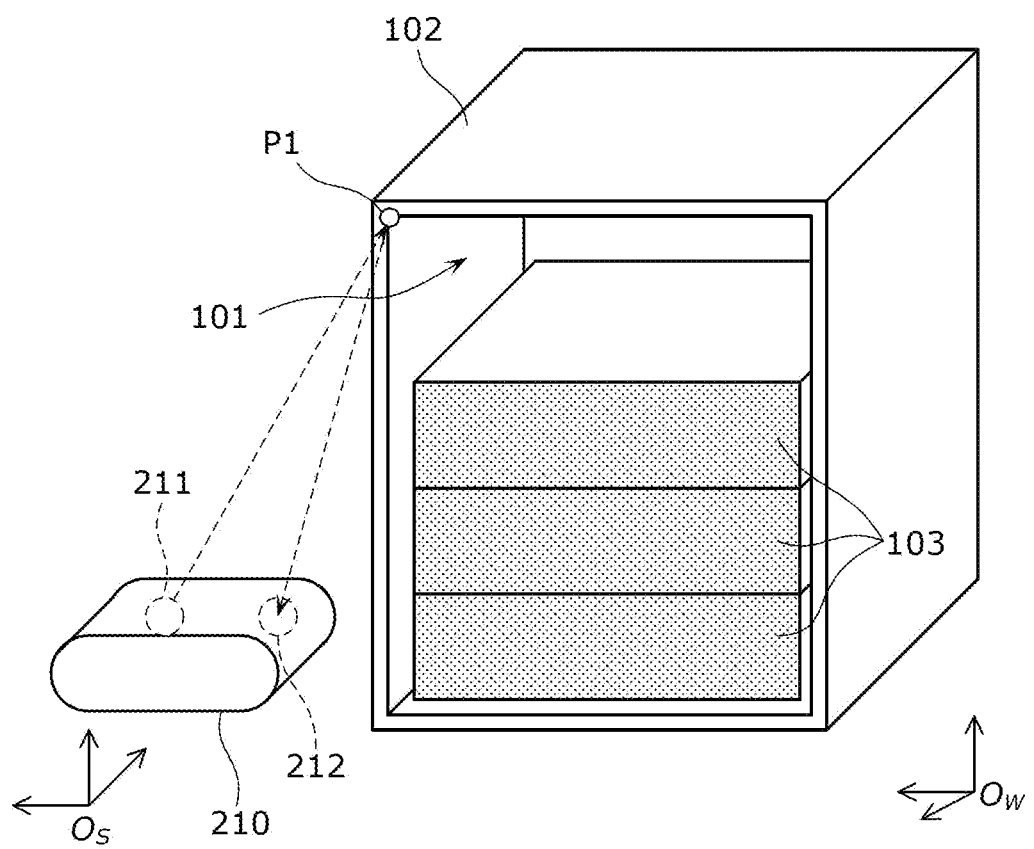
FIG. 3 is a diagram for describing a first example of a configuration of a range sensor.
Figure 4:
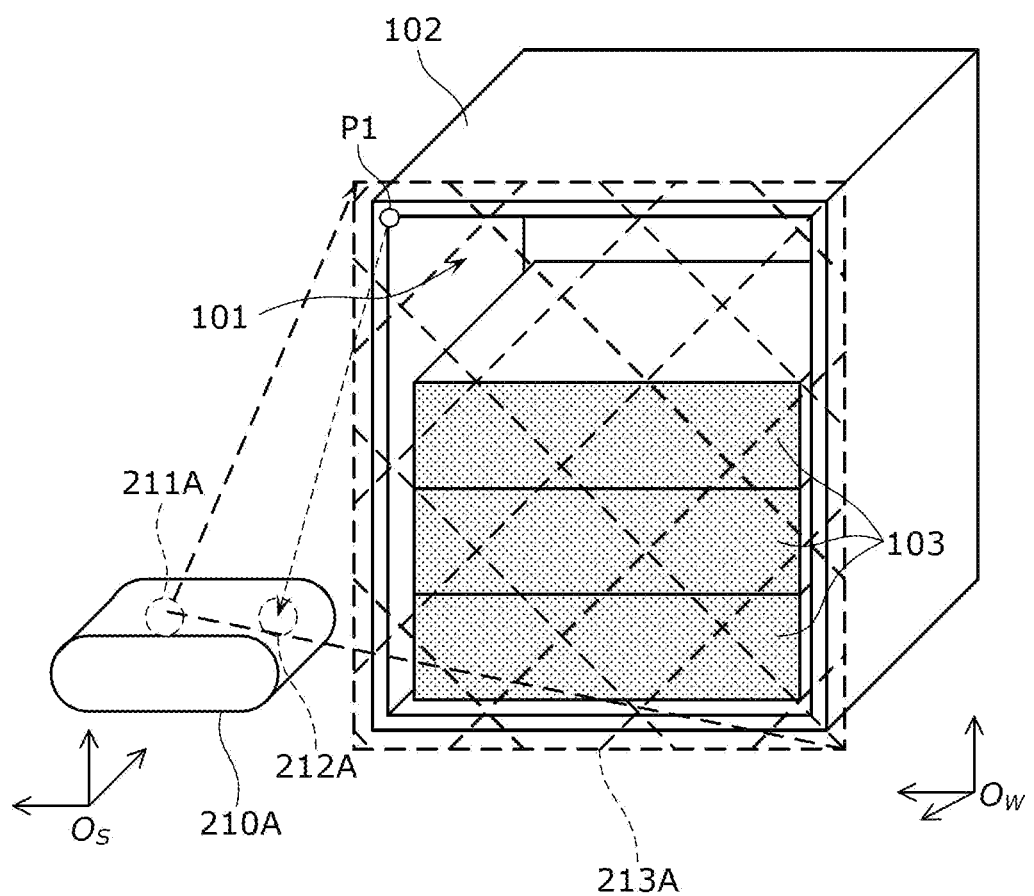
FIG. 4 is a diagram for describing a second example of the configuration of the range sensor.
Figure 5:
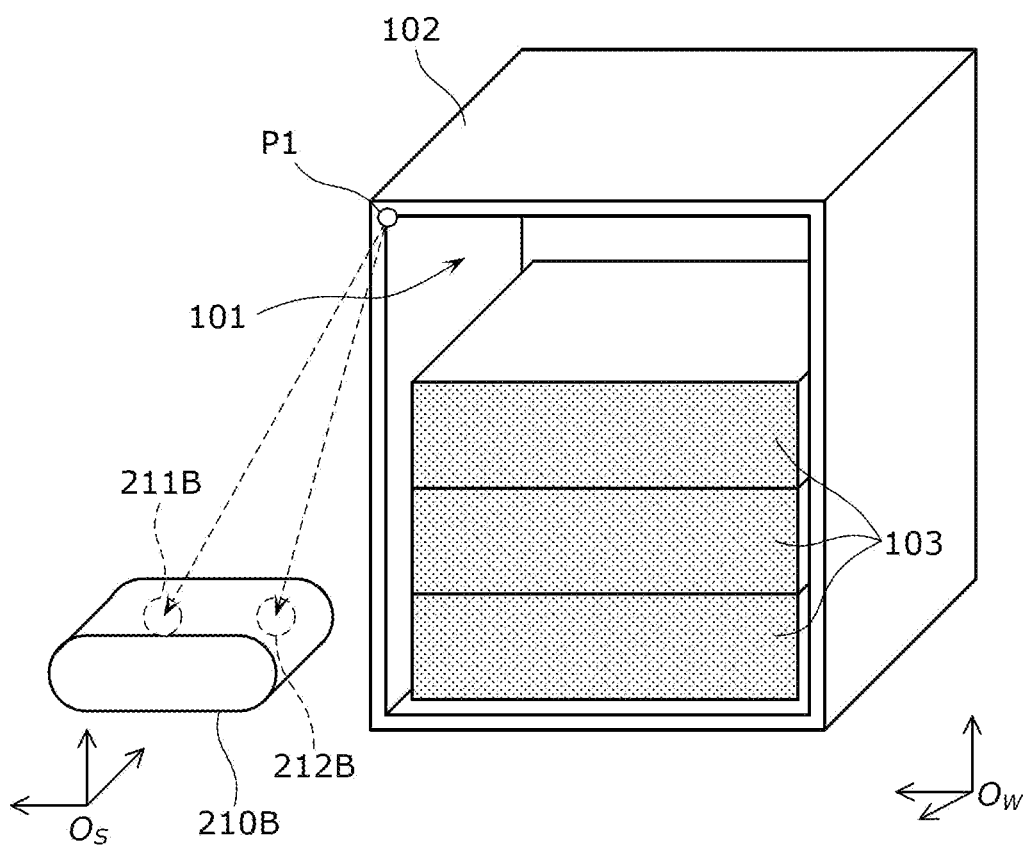
FIG. 5 is a diagram for describing a third example of the configuration of the range sensor.

FIG. 2 is a block diagram illustrating a characteristic configuration of a three-dimensional measurement system according to the embodiment. FIG. 3 is a diagram for describing a first example of a configuration of the range sensor. FIG. 4 is a diagram for describing a second example of the configuration of the range sensor. FIG. 5 is a diagram for describing a third example of the configuration of the range sensor.

As illustrated in FIG. 2, three-dimensional measurement system 200 includes range sensor 210 and information processing device 220. Three-dimensional measurement system 200 may include range sensors 210 or may include one range sensor 210.

Range sensor 210 measures a three-dimensional space including storage space 101 of rack 102 via opening 102a of rack 102, thus obtaining results of measurement including rack 102 and storage space 101 of rack 102. Specifically, range sensor 210 generates a space three-dimensional model represented as a group of three-dimensional points that indicate three-dimensional positions of measurement points on rack 102 or baggage 103 (hereinafter, referred to as measurement target) (on a surface of the measurement target). The group of the three-dimensional points is called three-dimensional point cloud. Three-dimensional positions indicated by three-dimensional points in a three-dimensional point cloud are each represented as, for example, a set of coordinates of three-value information consisting of an X component, a Y component, and a Z component in a three-dimensional coordinate space formed by XYZ axes. It should be noted that the three-dimensional model may include not only sets of three-dimensional coordinates but also color information items each indicating a color of a point or shape information items each representing a point and a surface shape around the point. The color information items may be each represented in, for example, an RGB color space or another color space such as HSV, HLS, and YUV.

A concrete example of range sensor 210 will be described with reference to FIG. 3 to FIG. 5.

As illustrated in FIG. 3, range sensor 210 in the first example emits electromagnetic waves and obtains reflected waves that are the electromagnetic waves reflected at a measurement target, thus generating a space three-dimensional model. Specifically, range sensor 210 measures a time taken by an emitted electromagnetic wave to be reflected at the measurement target and return to range sensor 210 from the emission and calculates a distance between range sensor 210 and point P1 on a surface of the measurement target using the measured time and a wavelength of the electromagnetic wave used for the measurement. Range sensor 210 emits electromagnetic waves from a reference point of range sensor 210 in predetermined radial directions. For example, range sensor 210 may emit electromagnetic waves in horizontal directions at first angular intervals and emit electromagnetic waves in vertical directions at second angular intervals. Therefore, by detecting a distance between range sensor 210 and the measurement target in each of directions from range sensor 210, range sensor 210 can calculate sets of three-dimensional coordinates of points on the measurement target. Range sensor 210 thus can calculate position information items indicating three-dimensional positions on the measurement target and can generate a space three-dimensional model including the position information items. The position information items may be a three-dimensional point cloud including three-dimensional points that indicate the three-dimensional positions.

As illustrated in FIG. 3, range sensor 210 in the first example is a three-dimensional laser measuring instrument including laser emitter 211 that emits laser light beams as the electromagnetic waves and laser receiver 212 that receives reflected light beams that are the emitted laser light beams reflected at a measurement target. Range sensor 210 scans the measurement target with laser light by rotating or swinging a unit including laser emitter 211 and laser receiver 212 about two different axes or by means of a movable mirror that swings about two axes (micro electro mechanical systems (MEMS) mirror) placed in a route of a laser beam emitted or to be received. This enables range sensor 210 to generate a high-precision, high-density three-dimensional model of the measurement target.

Although a three-dimensional laser measuring instrument that measures a distance from a measurement target by emitting laser light beams is exemplified as range sensor 210, range sensor 210 is not limited to this; range sensor 210 may be a millimeter-wave radar measuring instrument, which measured a distance from a measurement target by emitting millimeter waves.

Range sensor 210 may generate a three-dimensional model including color information. First color information items are color information items that are generated from images captured by range sensor 210 and indicate colors of first three-dimensional points included in a first three-dimensional point cloud.

Specifically, range sensor 210 may include a camera built therein that images a measurement target present around range sensor 210. The camera built in range sensor 210 images a region including an emission range of laser light beams emitted by range sensor 210, thus generating images. An imaging range imaged by the camera is associated in advance with the emission range. Specifically, directions in which laser light beams are emitted by range sensor 210 are associated in advance with pixels in an image captured by the camera, and range sensor 210 sets, as color information items indicating colors of three-dimensional points included in a three-dimensional point cloud, pixel values in the image associated with directions of the three-dimensional points. As illustrated in FIG. 4, range sensor 210A in the second example is a range sensor based on a structured light method.

Range sensor 210A includes infrared pattern emitter 211A and infrared camera 212A. Infrared pattern emitter 211A projects infrared pattern 213A, which is predetermined, onto a surface of a measurement target. Infrared camera 212A images the measurement target onto which infrared pattern 213A is projected, thereby obtaining an infrared image. Range sensor 210A searches infrared pattern 213A included in the obtained infrared image and calculates a distance from infrared pattern emitter 211A or infrared camera 212A to point P1 in the infrared pattern on the measurement target in real space based on a triangle formed by connecting three positions including a position of point P1 on the measurement target, a position of infrared pattern emitter 211A, and a position of infrared camera 212A. This enables range sensor 210A to obtain a three-dimensional position of a measurement point on the measurement target.

Range sensor 210A can obtain a high-density three-dimensional model by moving a unit of range sensor 210A including infrared pattern emitter 211A and infrared camera 212A or by making the infrared pattern emitted by infrared pattern emitter 211A have a fine texture.

Further, using a visible light range of color information that can be obtained by infrared camera 212A, range sensor 210A may generate a three-dimensional model including color information items by associating the obtained visible light range with three-dimensional points with consideration given to a position or an orientation of infrared pattern emitter 211A or infrared camera 212A. Alternatively, range sensor 210A may have a configuration further including a visible light camera for adding color information.

As illustrated in FIG. 5, range sensor 210B in the third example is a range sensor that measures three-dimensional points by stereo camera measurement. Range sensor 210B is a stereo camera that includes two cameras 211B and 212B. By imaging a measurement target with two cameras 211B and 212B at a synchronized timing, range sensor 210B obtains stereo images with parallax. Using the obtained stereo images (two images), range sensor 210B performs a matching process for a feature point on the two images, thus obtaining alignment information of the two images with pixel precision or sub-pixel precision. Based on a triangle formed by connecting a matched position of point P1 on a measurement target in real space and positions of two cameras 211B and 212B, range sensor 210B calculates a distance from any one of two cameras 211B and 212B to the matched position on the measurement target (i.e., point P1). This enables range sensor 210B to obtain a three-dimensional position of a measurement point on the measurement target.

Range sensor 210B can obtain a high-precision three-dimensional model by moving a unit of range sensor 210B including two cameras 211B and 212B or by increasing the number of cameras provided in range sensor 210B to three or more, imaging the same measurement target and performing the matching process.

Alternatively, using visible light cameras as cameras 211B and 212B included in range sensor 210B can make it easy to add color information to the obtained three-dimensional model.

It should be noted that the present embodiment will be described with an example in which information processing device 220 includes range sensor 210 in the first example, but information processing device 220 may have a configuration including range sensor 210A in the second example or range sensor 210B in the third example in place of range sensor 210 in the first example.

Two cameras 211B and 212B are capable of capturing monochrome images including visible light images or infrared images. In this case, the matching process on the two images by three-dimensional measurement system 200 may be performed using, for example, Simultaneous Localization And Mapping (SLAM) or Structure from Motion (SfM). Further, using information indicating positions and orientations of cameras 211B and 212B obtained by performing this process, a point cloud density of a measurement space model may be increased by Multi View Stereo (MVS).

Referring back to FIG. 2, a configuration of information processing device 220 will be described.

Information processing device 220 includes obtainer 221, coordinate system calculator 222, model generator 223, filling rate calculator 224, and storage 225.

Obtainer 221 obtains a space three-dimensional model and an image generated by range sensor 210. Specifically, obtainer 221 may obtain a space three-dimensional model and an image from range sensor 210. The space three-dimensional model and the image obtained by obtainer 221 may be stored in storage 225.

Coordinate system calculator 222 calculates a positional relation between range sensor 210 and rack 102 using the space three-dimensional model and the image. Coordinate system calculator 222 thereby calculates a measurement coordinate system based on a shape of a part of rack 102. Coordinate system calculator 222 may calculate a measurement coordinate system based only on the shape of the part of rack 102. Specifically, as the shape of the part based on which the measurement coordinate system is calculated, coordinate system calculator 222 calculates the measurement coordinate system based on a shape of opening 102a of rack 102. In a case where the shape of opening 102a is rectangular as illustrated in the embodiment, the shape of opening 102a based on which the measurement coordinate system is calculated may be a corner of the shape of opening 102a or may be a side of the shape of opening 102a.

It should be noted that the measurement coordinate system is a three-dimensional orthogonal coordinate system and is an example of a first three-dimensional coordinate system. By calculating the measurement coordinate system, a relative position and a relative orientation of range sensor 210 based on rack 102 can be determined. That is, this enables a sensor coordinate system of range sensor 210 to be aligned with the measurement coordinate system, thus enabling calibration between rack 102 and range sensor 210. It should be noted that the sensor coordinate system is a three-dimensional orthogonal coordinate system.

It should be noted that, in the present embodiment, rack 102 having a rectangular-parallelepiped shape includes opening 102a at one face of rack 102, but rack 102 is not limited to this. The rack may have a configuration in which openings are provided at faces of the rectangular-parallelepiped shape such as a configuration with openings at two faces including a front face and a rear face, and a configuration with openings at two faces including a front face and a top face. In a case where the rack includes openings, prescribed reference positions described later may be set to one of the openings. The prescribed reference positions may be set in a space where neither three-dimensional point nor voxel of a storage three-dimensional model being the three-dimensional model of rack 102 is present.

Here, coordinate system calculator 222 in the first example will be described with reference to FIG. 6 and FIG. 7.

Figure 6:
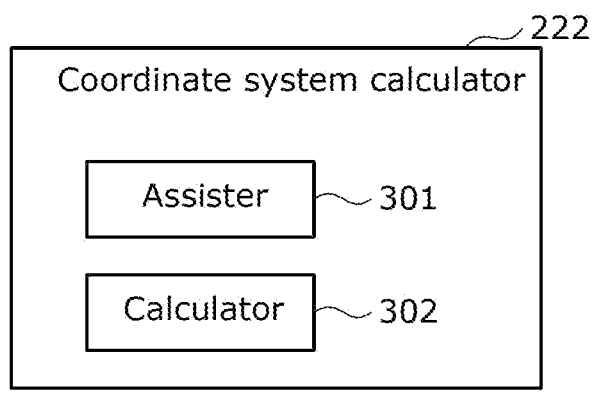
FIG. 6 is a block diagram illustrating a configuration of a coordinate system calculator in the first example.

FIG. 6 is a block diagram illustrating a configuration of the coordinate system calculator in the first example. FIG. 7 is a diagram for describing a method for calculating a measurement coordinate system by the coordinate system calculator in the first example.

Coordinate system calculator 222 calculates the measurement coordinate system. The measurement coordinate system is a three-dimensional coordinate system that serves as a reference for a space three-dimensional model. For example, range sensor 210 is placed at an origin of the measurement coordinate system and placed in an orientation in which range sensor 210 directly faces opening 102a of rack 102. At this time, the measurement coordinate system may be such that an upward direction of range sensor 210 is set as an X axis, a rightward direction is set as a Y axis, and a frontward direction is set as a Z axis. Coordinate system calculator 222 includes assister 301 and calculator 302.

Figure 7:
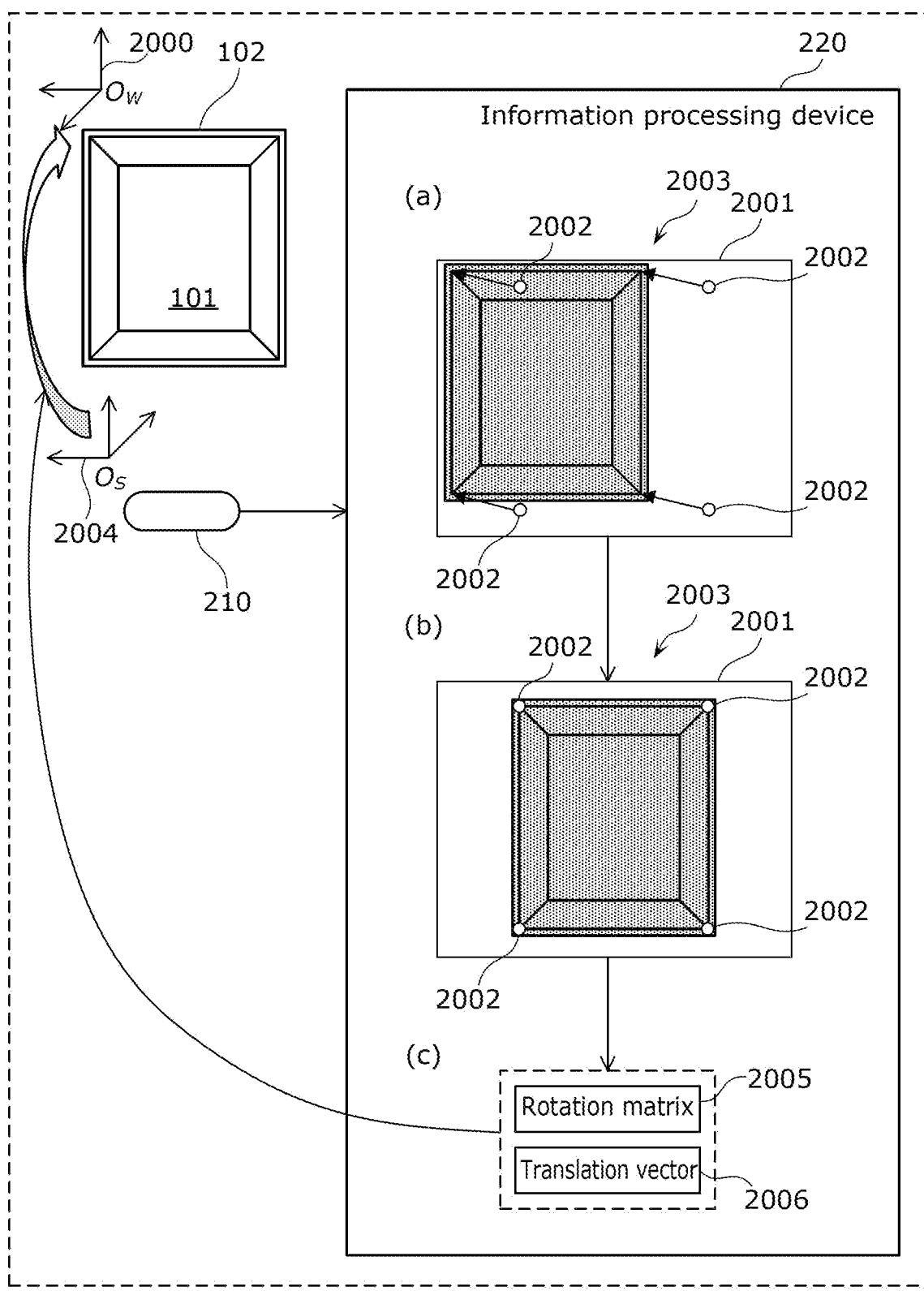
FIG. 7 is a diagram for describing a method for calculating a measurement coordinate system by the coordinate system calculator in the first example.

As illustrated in (a) of FIG. 7, assister 301 successively obtains images 2001, which are results of measurement by range sensor 210 obtained by obtainer 221, in real time, and superimposes adjustment markers 2002 on each of images 2001 successively obtained. Assister 301 successively outputs superimposed images 2003 in each of which adjustment marker 2002 is superimposed on image 2001, to a display device not illustrated. The display device successively displays superimposed images 2003 output from information processing device 220. It should be noted that assister 301 and the display device may be integrated together in range sensor 210.

Adjustment markers 2002 are markers for assisting a user in moving range sensor 210 such that a position and an orientation of range sensor 210 with respect to rack 102 become a specific position and a specific orientation. The user can dispose range sensor 210 such that range sensor 210 takes the specific position and the specific orientation with respect to rack 102 by changing the position and the orientation of range sensor 210 while watching superimposed images 2003 displayed on the display device such that adjustment markers 2002 match the prescribed reference positions on rack 102. The prescribed reference positions on rack 102 are, for example, positions of four corners of quadrilateral opening 102a of rack 102.

When range sensor 210 is disposed at the specific position and in the specific orientation with respect to rack 102, superimposed images 2003 in which four adjustment markers 2002 are superimposed at four positions corresponding to the positions of the four corners of opening 102a of rack 102 are generated. For example, by moving range sensor 210 such that adjustment markers 2002 move in directions of arrows illustrated in (a) of FIG. 7, the user can align four adjustment markers 2002 with the positions of the four corners of opening 102a as illustrated in (b) of FIG. 7.

Although assister 301 is configured to superimpose adjustment markers 2002 on image 2001, adjustment markers may be superimposed on a space three-dimensional model, and the space three-dimensional model on which the adjustment markers are superimposed may be displayed on the display device.

As illustrated in (c) of FIG. 7, calculator 302 calculates rotation matrix 2005 and translation vector 2006 that indicate a positional relation between rack 102 and range sensor 210 at a time when four adjustment markers 2002 are aligned with the positions of the four corners of opening 102a. Calculator 302 converts sensor coordinate system 2004 of range sensor 210 using rotation matrix 2005 and translation vector 2006 calculated, thus calculating measurement coordinate system 2000, of which an origin is a given corner (one of the four corners) of opening 102a. When four adjustment markers 2002 are aligned with the positions of the four corners of opening 102a, the user may make an input into an input device not illustrated. By obtaining a time when the input from the input device, information processing device 220 may determine a time when four adjustment markers 2002 are aligned with the positions of the four corners of opening 102a. Further, by analyzing image 2001, information processing device 220 may determine whether four adjustment markers 2002 have been aligned with the positions of the four corners of opening 102a.

Next, coordinate system calculator 222A in the second example will be described with reference to FIG. 8 and FIG. 9.

Figure 8:
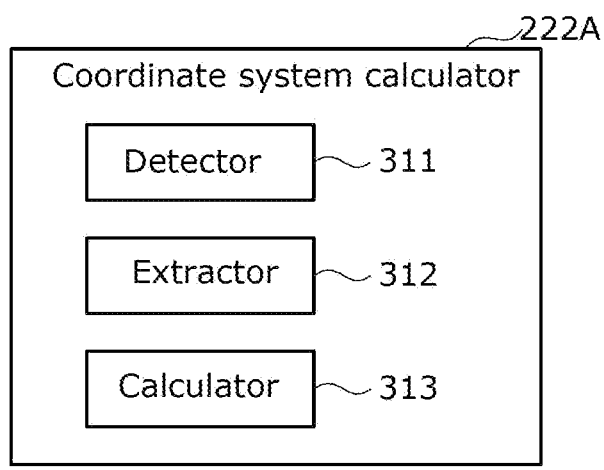
FIG. 8 is a block diagram illustrating a configuration of a coordinate system calculator in the second example.

FIG. 8 is a block diagram illustrating a configuration of the coordinate system calculator in the second example. FIG. 9 is a diagram for describing a method for calculating a measurement coordinate system by the coordinate system calculator in the second example.

Coordinate system calculator 222A includes detector 311, extractor 312, and calculator 313.

Figure 9:
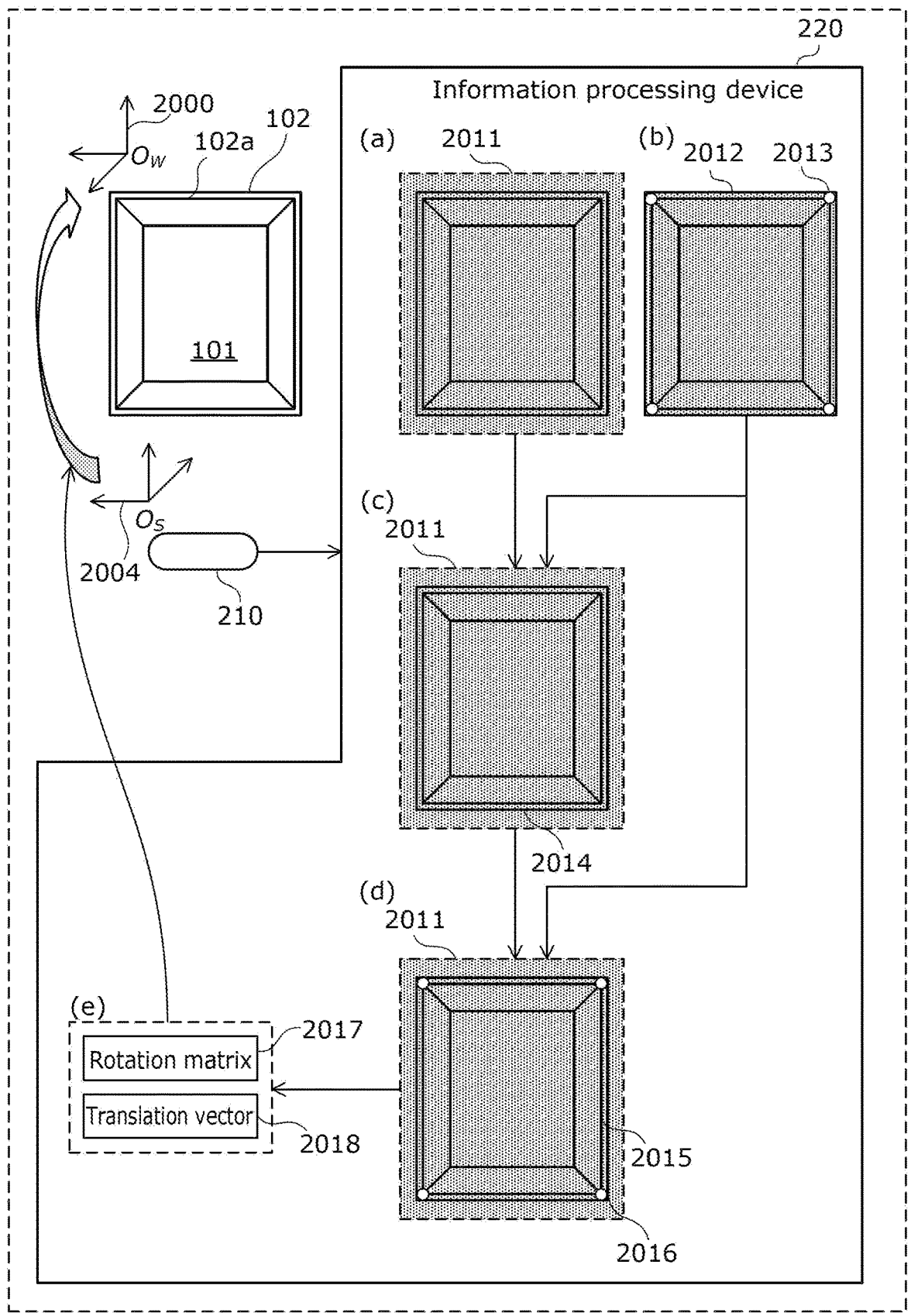
FIG. 9 is a diagram for describing a method for calculating a measurement coordinate system by the coordinate system calculator in the second example.

Using space three-dimensional model 2011, which is a result of measurement illustrated in (a) of FIG. 9 from range sensor 210 obtained by obtainer 221, and storage three-dimensional model 2012 illustrated in (b) of FIG. 9, detector 311 detects rack region 2014 corresponding to rack 102 as illustrated in (c) of FIG. 9. Storage three-dimensional model 2012 is a three-dimensional model of rack 102 where no baggage 103 is stored, and storage three-dimensional model 2012 is a three-dimensional model that is generated in advance using results of measurement, by range sensor 210, on rack 102 at the time when no baggage 103 is stored. Storage three-dimensional model 2012 is generated by model generator 223 described later and is stored in storage 225. Storage three-dimensional model 2012 may include position information 2013 that indicates positions of four corners of opening 102a of rack 102.

As illustrated in (d) of FIG. 9, using position information 2013 in storage three-dimensional model 2012, extractor 312 extracts four opening endpoints 2016, which are positions of four corners of opening 2015 in rack region 2014. A shape of opening 2015 defined by four opening endpoints 2016 is an example of a shape of a part based on which a measurement coordinate system is calculated.

As illustrated in (e) of FIG. 9, calculator 313 calculates rotation matrix 2017 and translation vector 2018 that indicate a positional relation between range sensor 210 and rack 102 based on the shape of four opening endpoints 2016 as viewed from range sensor 210. Calculator 313 converts sensor coordinate system 2004 of range sensor 210 using rotation matrix 2017 and translation vector 2018, thus calculating measurement coordinate system 2000. Specifically, when rotation matrix 2017 is denoted by R, and translation vector 2018 is denoted by T, calculator 313 can convert three-dimensional point x in sensor coordinate system 2004 into three-dimensional point X in measurement coordinate system 2000 by Equation 1 shown below. Calculator 313 thus can calculate measurement coordinate system 2000.

$$X = Rx + T \qquad (1)$$

Next, coordinate system calculator 222B in the third example will be described with reference to FIG. 10 and FIG. 11.

Figure 10:
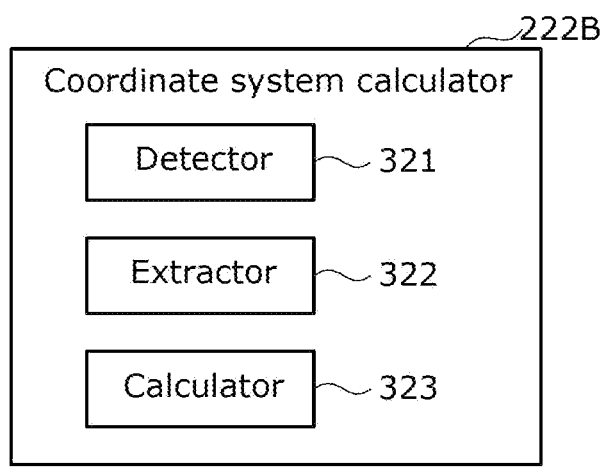
FIG. 10 is a block diagram illustrating a configuration of a coordinate system calculator in the third example.

FIG. 10 is a block diagram illustrating a configuration of the coordinate system calculator in the third example. FIG. 11 is a diagram for describing a method for calculating a measurement coordinate system by the coordinate system calculator in the third example.

Coordinate system calculator 222B includes detector 321, extractor 322, and calculator 323. In the third example, marker 104 is disposed at a specific position on rack 102 (e.g., a position on its top face), and coordinate system calculator 222B determines measurement coordinate system 2000 based on a position of marker 104. That is, measurement coordinate system 2000 in this case is a coordinate system based on the position of marker 104 placed on rack 102.

Marker 104 has, for example, a checkered pattern. Marker 104 is not limited to a checkered pattern as long as marker 104 is an alignment mark (registration mark) having a prescribed shape.

Figure 11:
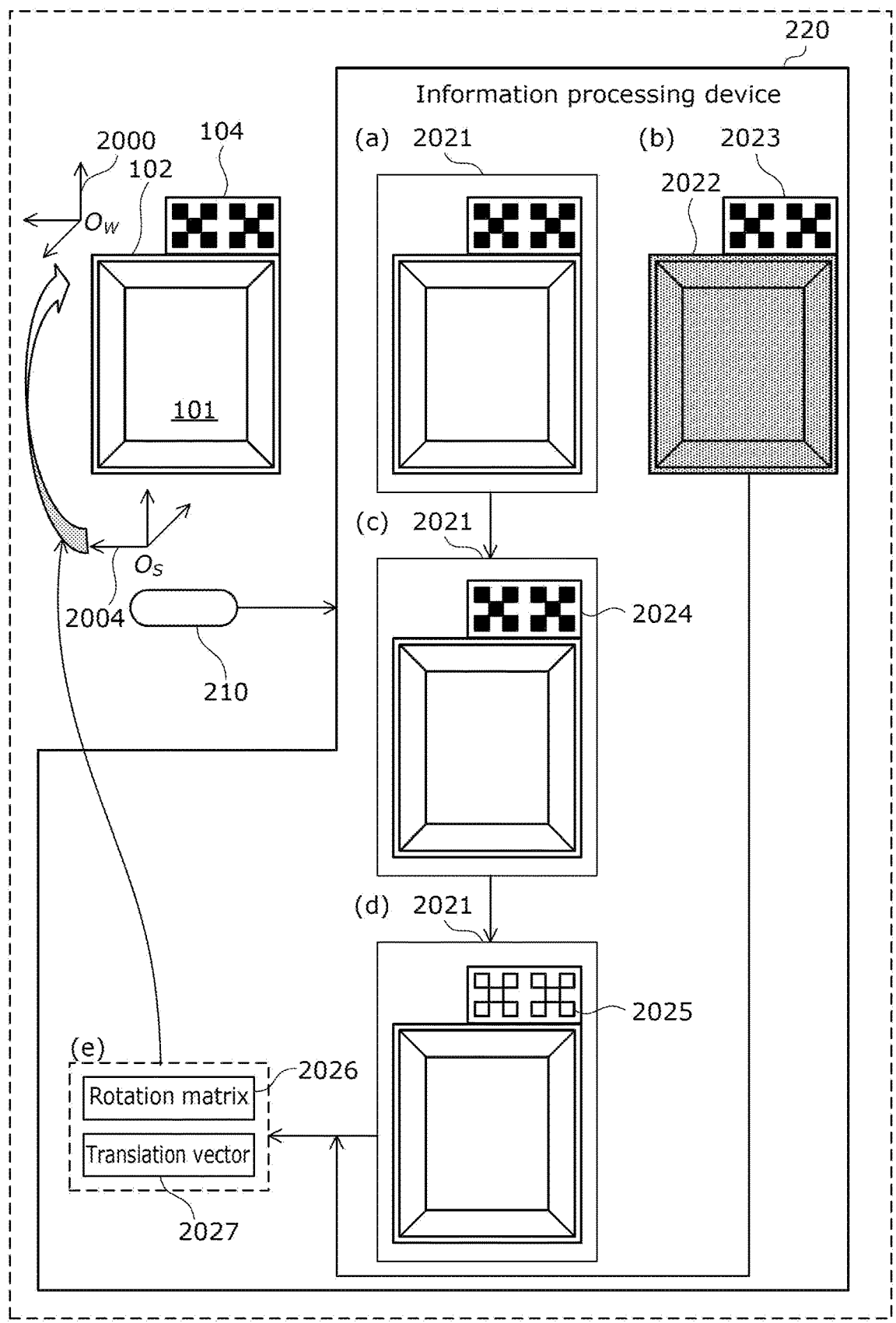
FIG. 11 is a diagram for describing a method for calculating a measurement coordinate system by the coordinate system calculator in the third example.

From image 2021 illustrated in (a) of FIG. 11, which is a result of measurement by range sensor 210 obtained by obtainer 221, detector 321 detects marker region 2024 corresponding to marker 104 placed on rack 102 as illustrated in (c) of FIG. 11.

From marker region 2024 in image 2021, extractor 322 extracts pattern contour 2025, which is a contour of the checkered pattern, as illustrated in (d) of FIG. 11.

Based on a shape of extracted pattern contour 2025, calculator 323 calculates rotation matrix 2026 and translation vector 2027 that indicate a positional relation between range sensor 210 and marker 104. Using rotation matrix 2026 and translation vector 2027, and a positional relation between storage three-dimensional model 2022 and marker 2023 illustrated in (b) of FIG. 11, calculator 323 calculates a three-dimensional positional relation between range sensor 210 and rack 102 and calculates measurement coordinate system 2000 by converting sensor coordinate system 2004 using the calculated three-dimensional positional relation. It should be noted that the positional relation between storage three-dimensional model 2022 and marker 2023 may be measured in advance or may be generated in advance based on design information of rack 102 on which marker 104 is disposed.

Referring back to FIG. 2, model generator 223 will be described.

Model generator 223 generates a storage three-dimensional model, which is a three-dimensional model of rack 102 where no baggage 103 is stored. Model generator 223 obtains a result of measurement by range sensor 210 on rack 102 where no baggage 103 is stored, thus generating the storage three-dimensional model. A specific process by model generator 223 will be described later. The generated storage three-dimensional model is stored in storage 225.

Here, model generator 223 will be described specifically with reference to FIG. 12 and FIG. 13.

Figure 12:
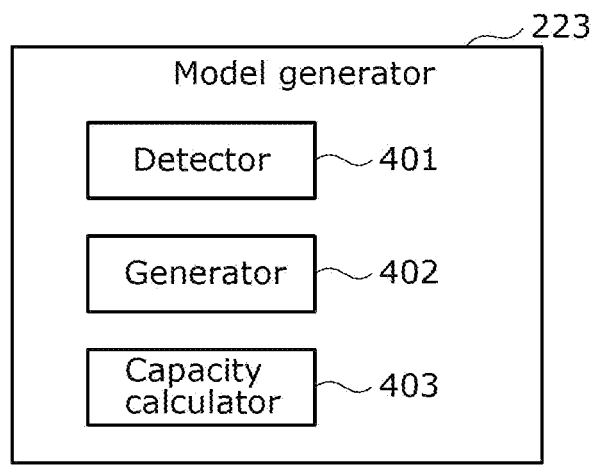
FIG. 12 is a block diagram illustrating an example of a configuration of a model generator.
Figure 13:
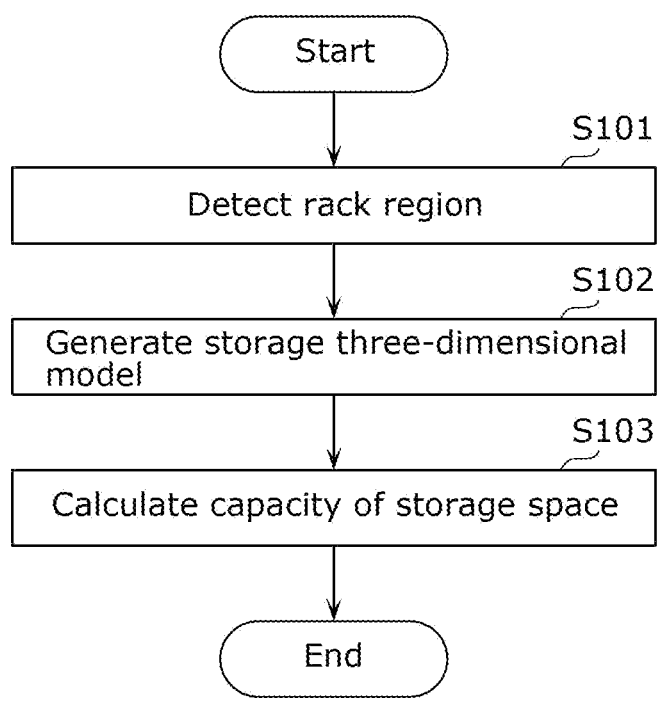
FIG. 13 is a flowchart of a process of calculating a capacity of a storage space by the model generator.

FIG. 12 is a block diagram illustrating an example of a configuration of the model generator. FIG. 13 is a flowchart of a process of calculating a capacity of a storage space by the model generator.

Model generator 223 includes detector 401, generator 402, and capacity calculator 403.

Detector 401 detects a rack region corresponding to rack 102 from a space three-dimensional model measured by range sensor 210 (S101). In a case where three-dimensional measurement system 200 includes range sensors 210, detector 401 performs the process of step S101 on each of range sensors 210. Detector 401 thus detects rack regions corresponding to range sensors 210.

In a case where three-dimensional measurement system 200 includes range sensors 210, generator 402 integrates the rack regions together, thus generating a storage three-dimensional model (S102). Specifically, generator 402 may perform alignment of a three-dimensional point cloud by Iterative Closest Point (ICP) to integrate the rack regions together or may calculate a relative positional relation among range sensors 210 in advance and integrate the rack regions together based on the calculated relative positional relation. The relative positional relation may be calculated by Structure from Motion (SfM) using images obtained by range sensors 210 as multi-viewpoint images. Range sensors 210 may be placed based on a design drawing in which the relative positional relation is determined.

The storage three-dimensional model of rack 102 may be generated by using results of measurement measured at positions to which one range sensor 210 is moved, rather than using range sensors 210, and by integrating rack regions obtained from the results of measurement.

Without using the results of measurement by range sensor 210, the storage three-dimensional model may be generated based on 3DCAD data at a time when rack 102 is designed or may be generated based on dimension measurement data of rack 102 or on equipment specification data of rack 102 published from its manufacturer.

In a case where three-dimensional measurement system 200 does not include range sensors 210 but includes only one range sensor 210, and one result of measurement measured at one position is used, model generator 223 need not include generator 402. That is, model generator 223 need not perform step S102.

Capacity calculator 403 calculates a capacity of storage space 101 of rack 102 using the storage three-dimensional model (S103).

Referring back to FIG. 2, filling rate calculator 224 will be described.

Filling rate calculator 224 calculates a filling rate of baggage 103 with respect to storage space 101 of rack 102. For example, filling rate calculator 224 may calculate, as the filling rate, a proportion of a volume of baggage 103 to the capacity of storage space 101 using a space three-dimensional model obtained by range sensor 210, an image, and measurement coordinate system 2000.

Here, filling rate calculator 224 will be described specifically with reference to FIG. 14 and FIG. 15.

Figure 14:
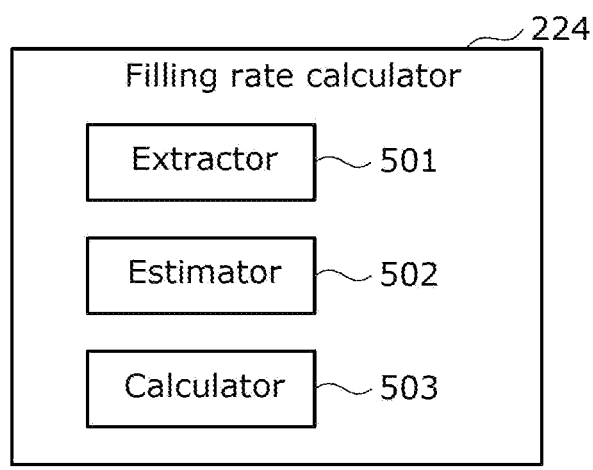
FIG. 14 is a block diagram illustrating an example of a configuration of a filling rate calculator.

FIG. 14 is a block diagram illustrating an example of a configuration of the filling rate calculator. FIG. 15 is a diagram for describing an example of a method for calculating the filling rate by the filling rate calculator. FIG. 15 illustrates an example of a case where range sensor 210 directly faces opening 102a of rack 102. Range sensor 210 is disposed on a Z-axis negative direction side on which opening 102a of rack 102 is formed, and range sensor 210 measures storage space 101 of rack 102 via opening 102a of rack 102. That is, range sensor 210 is disposed above rack 102 in a vertical direction. This example is an example of a case where measurement coordinate system 2000 is measured by coordinate system calculator 222 in the first example. That is, in this case, sensor coordinate system 2004 matches measurement coordinate system 2000.

Filling rate calculator 224 includes extractor 501, estimator 502, and calculator 503.

Using space three-dimensional model 2011 and a storage three-dimensional model, extractor 501 extracts baggage region 2033, which is a portion of the space three-dimensional model corresponding to baggage 103. Specifically, extractor 501 converts a data structure of space three-dimensional model 2011 illustrated in (a) of FIG. 15, which is a result of measurement by range sensor 210 obtained by obtainer 221, into voxel data, thus generating voxel data 2031 illustrated in (b) of FIG. 15. Using voxel data 2031 generated and storage three-dimensional model 2032 illustrated in (c) of FIG. 15, which is a storage three-dimensional model converted into voxels, extractor 501 subtracts storage three-dimensional model 2032 from voxel data 2031, thus extracting baggage region 2033 in voxel data 2031 illustrated in (d) of FIG. 15, which is a region resulting from measuring baggage 103. Baggage region 2033 is an example of a target portion, which is a portion corresponding to a measurement target.

Using baggage region 2033 extracted, estimator 502 estimates baggage model 2034, which is a three-dimensional model of baggage 103 in storage space 101. Specifically, using baggage region 2033, estimator 502 interpolates baggage region 2033 toward a region in which baggage 103 is hidden with respect to range sensor 210 in a Z-axis direction, in which range sensor 210 and rack 102 are arranged, that is, toward a Z-axis positive direction side. For example, for each of voxels constituting baggage region 2033, estimator 502 determines whether the voxel is a voxel that is disposed on the Z-axis negative direction side of a farthest voxel, which is disposed farthest on the Z-axis positive direction side among the voxels. When the voxel is disposed on the Z-axis negative direction side of the farthest voxel, in a case where there are no voxels disposed on the Z-axis positive direction side of the voxel, estimator 502 interpolates voxels up to the same position as a position of the farthest voxel in the Z-axis direction. Estimator 502 thus estimates baggage model 2034 as illustrated in (e) of FIG. 15.

Using the storage three-dimensional model and baggage model 2034, calculator 503 calculates a first filling rate of baggage 103 with respect to storage space 101. Specifically, calculator 503 counts the number of voxels constituting baggage model 2034 and multiplies a predetermined voxel size by the counted number, thus calculating the volume of baggage 103. Calculator 503 calculates, as the first filling rate, a proportion of the calculated volume of baggage 103 with respect to the capacity of storage space 101 of rack 102 calculated by model generator 223.

Figure 16:
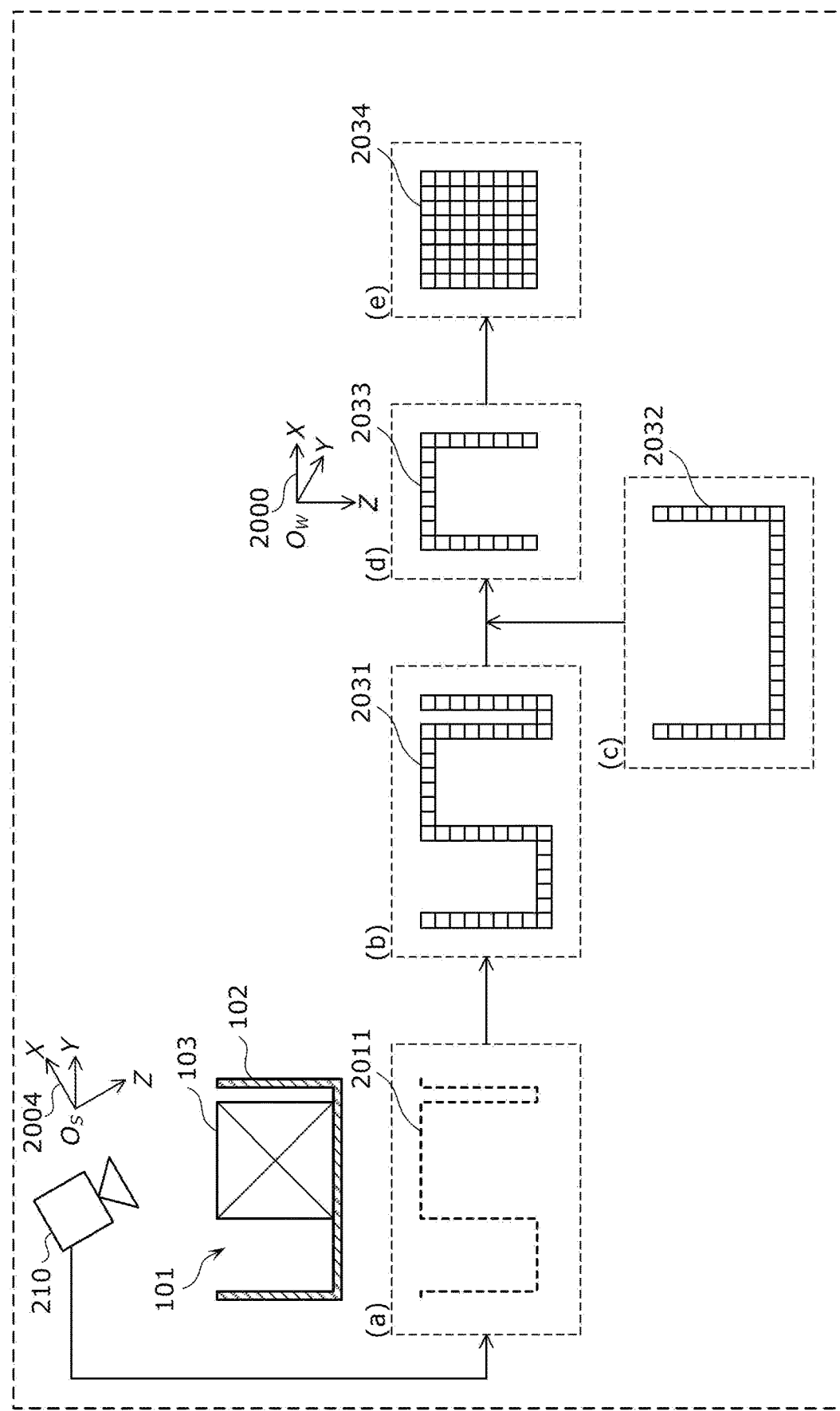
FIG. 16 is a diagram for describing another example of the method for calculating a filling rate by the filling rate calculator.

Range sensor 210 need not directly face opening 102a of rack 102. FIG. 16 is a diagram for describing another example of the method for calculating the filling rate by the filling rate calculator. FIG. 16 illustrates an example of a case where range sensor 210 is disposed inclined with respect to opening 102a of rack 102. This example is an example of a case where measurement coordinate system 2000 is measured by coordinate system calculator 222A in the second example or coordinate system calculator 222B in the third example. That is, in this case, sensor coordinate system 2004 differs from measurement coordinate system 2000.

A coordinate system used in the case in the example illustrated in FIG. 16 is measurement coordinate system 2000. Using baggage region 2033, estimator 502 interpolates baggage region 2033 toward a region in which baggage 103 is hidden with respect to range sensor 210 in a Z-axis direction of measurement coordinate system 2000, in which range sensor 210 and rack 102 are arranged, that is, toward the Z-axis positive direction side.

Figure 15:
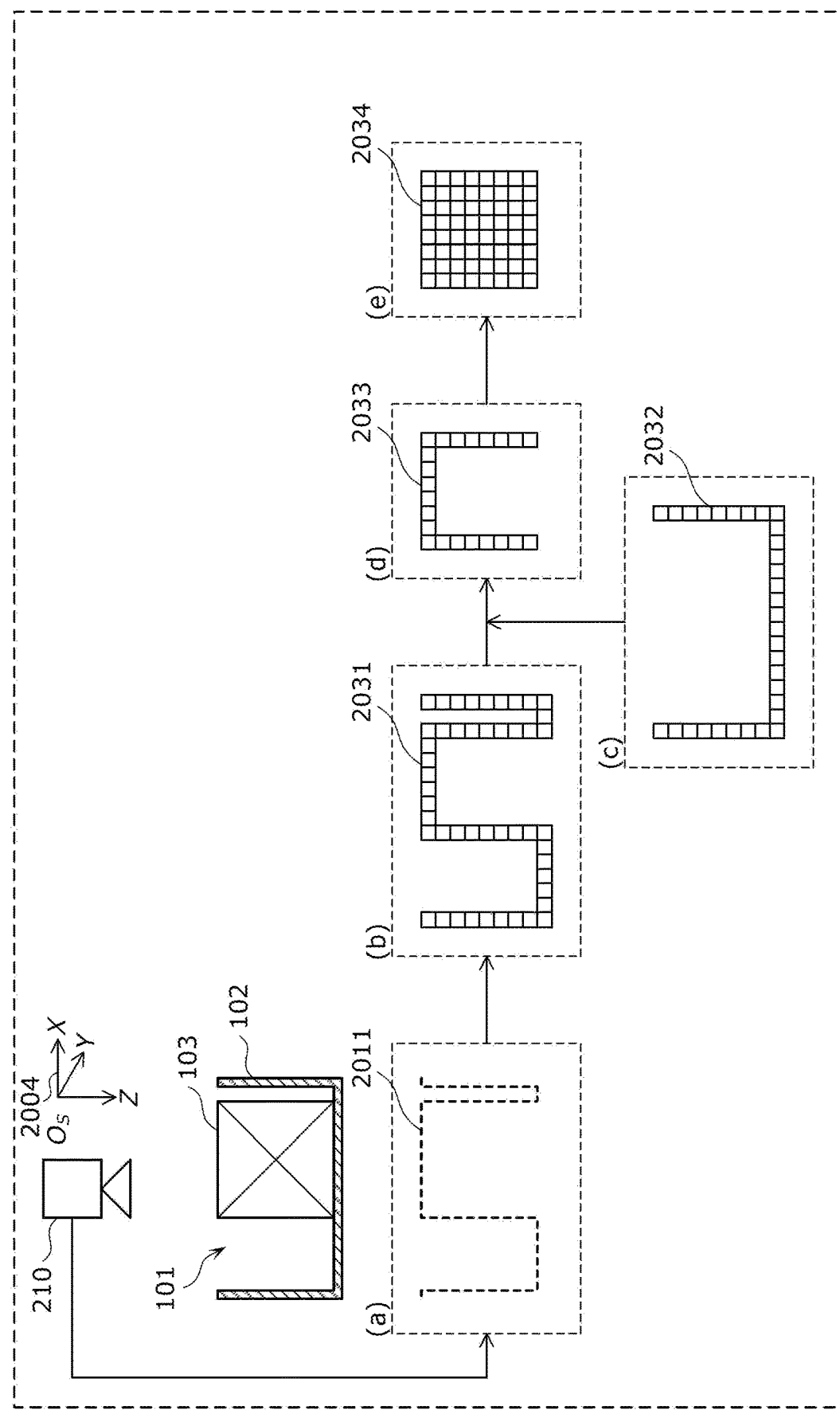
FIG. 15 is a diagram for describing an example of a method for calculating a filling rate by the filling rate calculator.

The rest of processing by filling rate calculator 224 is the same as in the case illustrated in FIG. 15, and thus description thereof will be omitted.

It should be noted that a combination of the space three-dimensional model and the image used for the calculation of the measurement coordinate system by coordinate system calculator 222 and the calculation of the filling rate by filling rate calculator 224 may be results of measurement performed by range sensor 210 at the same time or may be results of measurement performed at different times.

Range sensor 210 and information processing device 220 may be connected to each other via a communication network so as to be communicated with each other. The communication network may be a public telecommunication network such as the Internet or a private telecommunication network. Thus, the space three-dimensional model and the image obtained by range sensor 210 are transmitted from range sensor 210 to information processing device 220 via the communication network.

Information processing device 220 may obtain the space three-dimensional model and the image from range sensor 210 not via the communication network. For example, the space three-dimensional model and the image may be stored once from range sensor 210 in an external storage device such as a hard disk drive (HDD) and a solid state drive (SSD), and information processing device 220 may obtain the space three-dimensional model and the image from the external storage device. Alternatively, the external storage device may be a cloud server.

For example, information processing device 220 includes at least a computer system that includes a control program, a processing circuit that executes the control program, such as a processor and a logic circuit, and a recording device that stores the control program such as an internal memory or an accessible external memory. Functions by processing units of information processing device 220 may be implemented in a form of software or may be implemented in a form of hardware.

Next, operation of information processing device 220 will be described.

Figure 17:
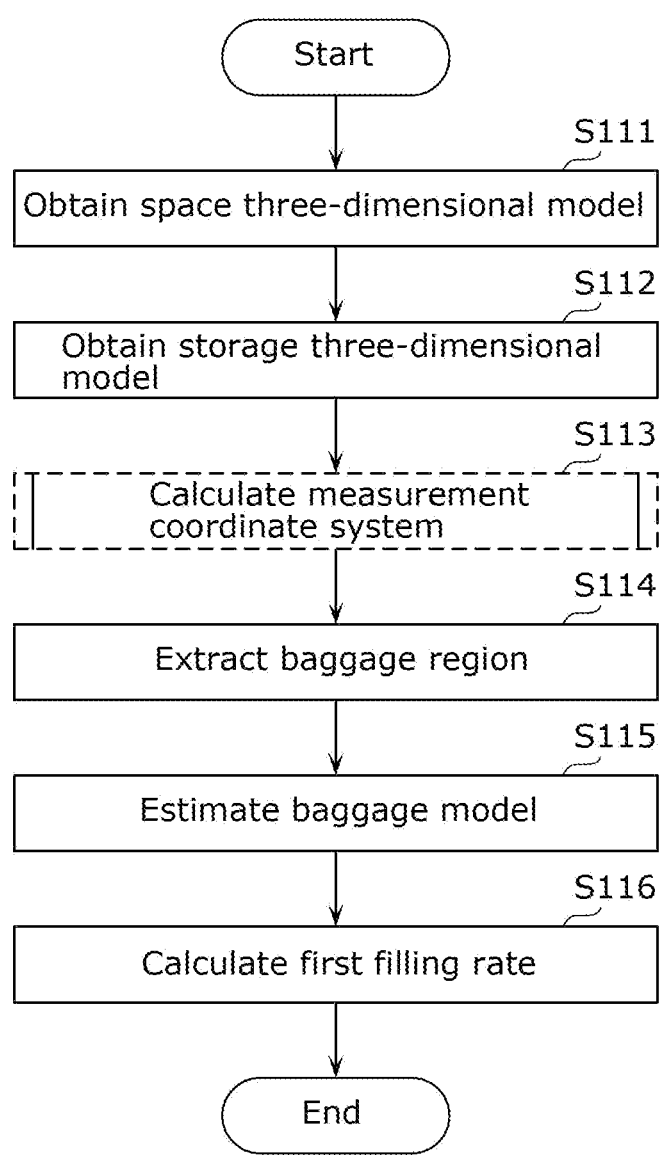
FIG. 17 is a flowchart of a filling rate measurement method performed by an information processing device.

FIG. 17 is a flowchart of a filling rate measurement method performed by the information processing device.

Information processing device 220 obtains a space three-dimensional model from range sensor 210 (S111). At this time, information processing device 220 may further obtain an image of a measurement target from range sensor 210.

Information processing device 220 obtains a storage three-dimensional model stored in storage 225 (S112).

Information processing device 220 calculates a measurement coordinate system based on a shape of opening 102a of rack 102 (S113). Step S113 is a process by coordinate system calculator 222.

Using voxel data 2031 of space three-dimensional model 2011 and storage three-dimensional model 2032 of the storage three-dimensional model, information processing device 220 extracts baggage region 2033 that corresponds to baggage 103 in voxel data 2031 (S114). Step S114 is a process by extractor 501 of filling rate calculator 224.

Using baggage region 2033 extracted, information processing device 220 estimates baggage model 2034, which is a three-dimensional model of baggage 103 in storage space 101 (S115). Step S115 is a process by estimator 502 of filling rate calculator 224.

Using the storage three-dimensional model and baggage model 2034, information processing device 220 calculates a first filling rate of baggage 103 with respect to storage space 101 (S116). Step S116 is a process by calculator 503 of filling rate calculator 224.

Figure 18:
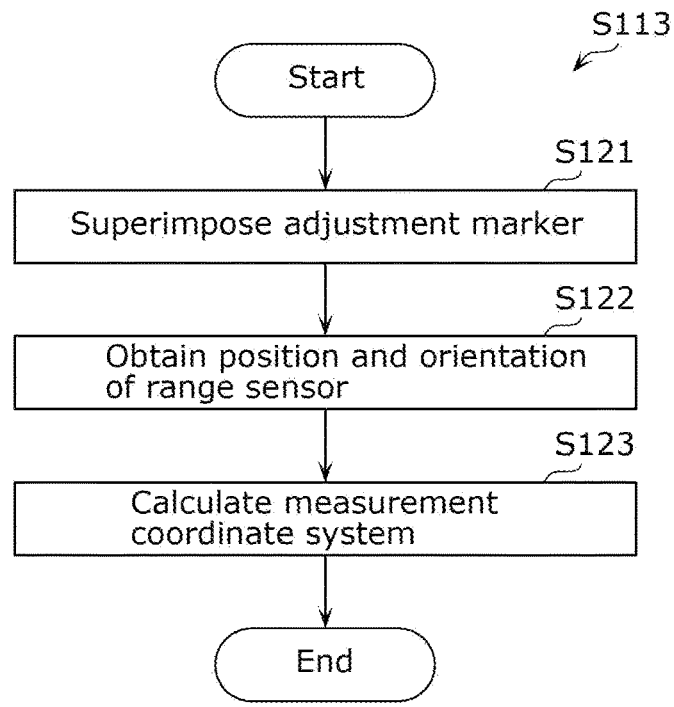
FIG. 18 is a flowchart of a process of calculating a measurement coordinate system by the coordinate system calculator in the first example.

FIG. 18 is a flowchart of the process of calculating the measurement coordinate system by the coordinate system calculator in the first example (S113).

Coordinate system calculator 222 successively obtains images 2001, which are results of measurement by range sensor 210 obtained by obtainer 221, in real time, and superimposes adjustment markers 2002 on each of images 2001 successively obtained (S121). Step S121 is a process by assister 301 of coordinate system calculator 222.

Coordinate system calculator 222 obtains a position and orientation of range sensor 210 (S122). Step S122 is a process by assister 301 of coordinate system calculator 222.

Using the position and the orientation of range sensor 210 at a time when four adjustment markers 2002 are aligned with positions of four corners of opening 102a, coordinate system calculator 222 determines sensor coordinate system 2004 of range sensor 210 and calculates measurement coordinate system 2000 using determined sensor coordinate system 2004 (S123). Step S123 is a process by calculator 302 of coordinate system calculator 222.

Figure 19:
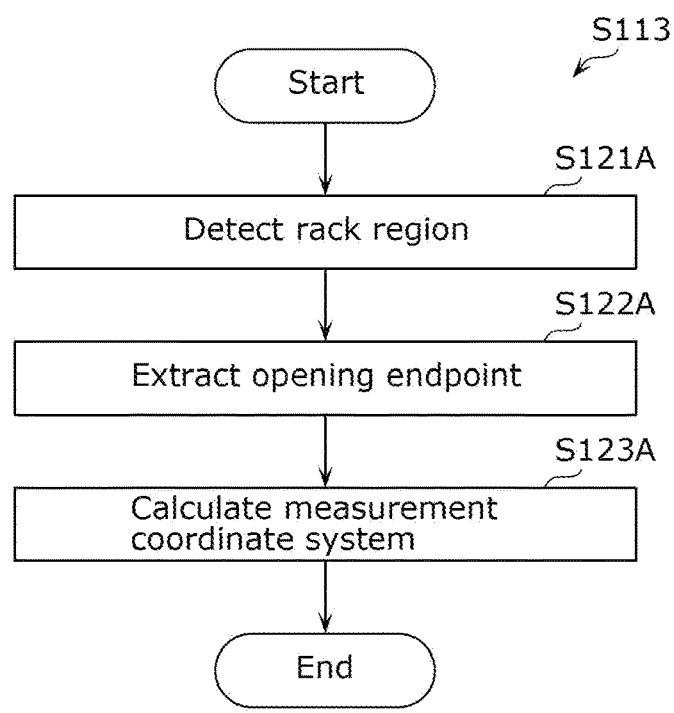
FIG. 19 is a flowchart of a process of calculating a measurement coordinate system by the coordinate system calculator in the second example.

FIG. 19 is a flowchart of the process of calculating the measurement coordinate system by the coordinate system calculator in the second example (S113).

Using space three-dimensional model 2011, which is a result of measurement by range sensor 210 obtained by obtainer 221, and storage three-dimensional model 2012, coordinate system calculator 222A detects rack region 2014 corresponding to rack 102 (S121A). Step S121A is a process by detector 311 of coordinate system calculator 222A.

Using position information 2013 in storage three-dimensional model 2012, coordinate system calculator 222A extracts four opening endpoints 2016, which are positions of four corners of opening 2015 in rack region 2014 (S122A). Step S122A is a process by extractor 312 of coordinate system calculator 222A.

Coordinate system calculator 222A calculates rotation matrix 2017 and translation vector 2018 that indicate a positional relation between range sensor 210 and rack 102 based on a shape of four opening endpoints 2016 as viewed from range sensor 210. Coordinate system calculator 222A then converts sensor coordinate system 2004 of range sensor 210 using rotation matrix 2017 and translation vector 2018, thus calculating measurement coordinate system 2000 (S123A). Step S123A is a process by calculator 313 of coordinate system calculator 222A.

Figure 20:
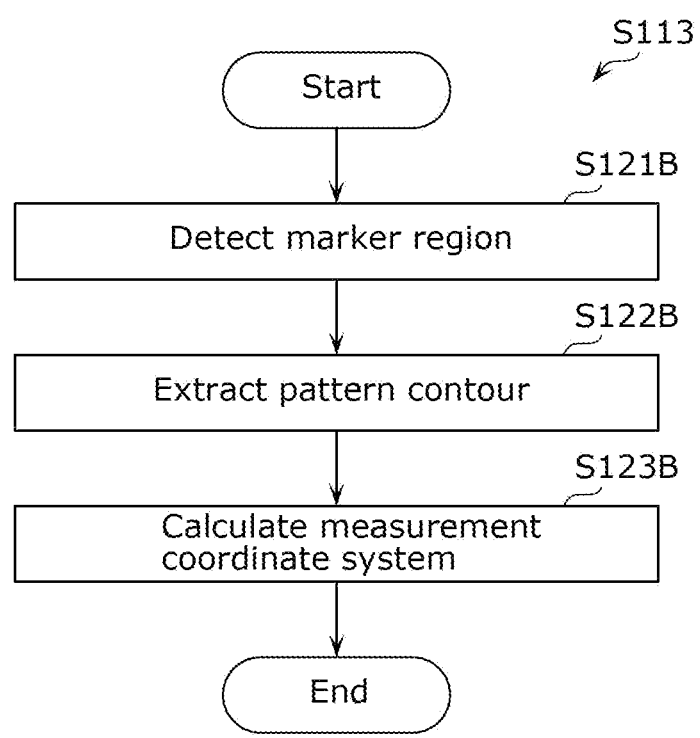
FIG. 20 is a flowchart of a process of calculating a measurement coordinate system by the coordinate system calculator in the third example.

FIG. 20 is a flowchart of the process of calculating the measurement coordinate system by the coordinate system calculator in the third example (S113).

Coordinate system calculator 222B detects marker region 2024 from image 2021, which is a result of measurement by range sensor 210 obtained by obtainer 221 (S121B). Step S121B is a process by detector 321 of coordinate system calculator 222B.

From marker region 2024 in image 2021, coordinate system calculator 222B extracts pattern contour 2025 (S122B). Step S122B is a process by extractor 322 of coordinate system calculator 222B.

Based on a shape of extracted pattern contour 2025, coordinate system calculator 222B calculates rotation matrix 2026 and translation vector 2027 that indicate a positional relation between range sensor 210 and marker 104. Using rotation matrix 2026 and translation vector 2027, and a positional relation between storage three-dimensional model 2022 and marker 2023, coordinate system calculator 222B then calculates a three-dimensional positional relation between range sensor 210 and rack 102 and calculates measurement coordinate system 2000 by converting sensor coordinate system 2004 using the calculated three-dimensional positional relation (S123B). Step S123B is a process by calculator 323 of coordinate system calculator 222B.

The filling rate calculated by information processing device 220 may be output from information processing device 220. The filling rate may be displayed by a display device not illustrated included in information processing device 220 or may be transmitted to an external device different from information processing device 220. For example, the calculated filling rate may be output to a baggage conveyance system and used for controlling the baggage conveyance system.

In the filling rate measurement method according to the present embodiment, baggage model 2034 of baggage 103 is estimated using baggage region 2033 that is extracted using the space three-dimensional model made by measuring rack 102 in a state where baggage 103 is stored and the storage three-dimensional model of rack 102 where no baggage 103 is stored. This enables the first filling rate of baggage 103 with respect to storage space 101 to be calculated easily only by measuring rack 102 in a state where baggage 103 is stored.

In addition, in the filling rate measurement method, baggage model 2034 is estimated based on a three-dimensional coordinate system based on a shape of a part of rack 102. Therefore, a processing amount of estimation of baggage model 2034 can be reduced.

In addition, in the filling rate measurement method, baggage model 2034 is estimated based on a three-dimensional coordinate system based only on a shape of a part of rack 102. A shape of only a part of the first storage, which is easy to extract on an image, can be used for calculation of a measurement coordinate system. Therefore, a processing speed of the estimation of the baggage model can be improved, and a precision of calculating the measurement coordinate system can be improved.

Further, in the filling rate measurement method, the three-dimensional coordinate system is a three-dimensional orthogonal coordinate system having the Z axis, and baggage model 2034 is estimated by interpolating the Z-axis positive direction side, which is opposite to a Z-axis negative direction of baggage region 2033. This enables an effective reduction in processing amount of the estimation of baggage model 2034.

Further, in the filling rate measurement method, the three-dimensional coordinate system is a coordinate system based on the shape of opening 102a of rack 102. Therefore, the coordinate system based on the shape of opening 102a of rack 102 can be calculated easily, and baggage model 2034 can be estimated based on the calculated coordinate system.

Further, in the filling rate measurement method, the three-dimensional coordinate system is a coordinate system based on marker 104 placed on rack 102. Therefore, the coordinate system based on marker 104 can be calculated easily, and baggage model 2034 can be estimated based on the calculated coordinate system.

Further, in the filling rate measurement method, range sensor 210B includes at least two cameras for generating a space three-dimensional model. Range sensor 210 including such range sensor 210B is fixed above the first storage.

In a case where range sensor 210 is fixed above the first storage in this manner, in a case where the first storage is movable such as a cage carriage described later, objects present within a measurement range of range sensor 210 are limited to the ground, a mount (bottom face) of the cage carriage, or the like, there is no movable object other than the cage carriage; therefore, a measurement target can be easily separated from a background from a result of measurement. It should be noted that the measurement range is an imaging range of a camera in a case where range sensor 210 includes the camera. In contrast, in a case where range sensor 210 is fixed at a position not above the first storage, a moving object other than the first storage tends to be present within the measurement range, and thus it is difficult to separate a measurement target from a background.

Variation 1

Information processing device 220 according to the embodiment described above is configured to calculate the proportion of the volume of baggage 103 stored in storage space 101 with respect to the capacity of storage space 101 as the filling rate, but the configuration is not limited to this.

Figure 21:
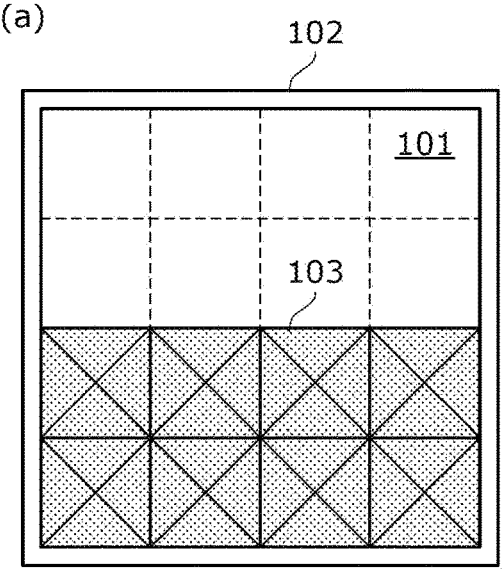
FIG. 21 is a diagram for describing a method for calculating a filling rate.
Figure 21:
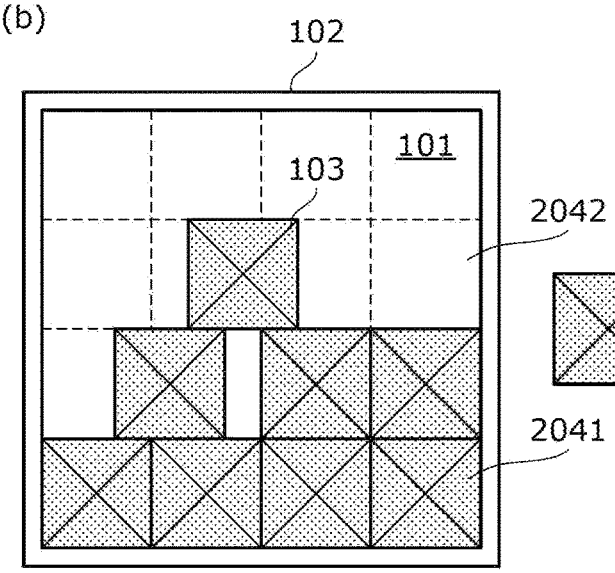
Figure 21:
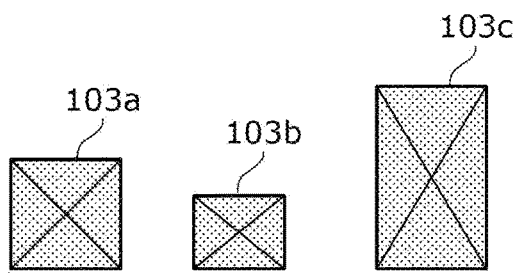

FIG. 21 is a diagram for describing a method for calculating a filling rate.

In (a) and (b) of FIG. 21, storage space 101 of rack 102 has a capacity that is capable of storing just 16 pieces of baggage 103. As illustrated (a) of FIG. 21, when eight pieces of baggage 103 are closely disposed, a vacancy of storage space 101 can store additional eight pieces of baggage 103. In contrast, as illustrated (b) of FIG. 21, when the pieces of baggage are disposed not closely, it is necessary to move the pieces of baggage 103 already stored so as to store additional eight pieces of baggage 103 in the rest of the space of storage space 101. If pieces of baggage 103 are stored in the rest of the space of storage space 101 without moving the pieces of baggage 103 already stored, only six pieces of baggage 103 can be stored.

As seen from the above, although the numbers of pieces of baggage 103 storable in the rest of the space of storage space 101 are different between the case illustrated in (a) of FIG. 21 and the case illustrated in (b) of FIG. 21, filling rates of both cases are calculated as the same filling rate, 50%. It is therefore conceivable to calculate a filling rate with consideration given to a space in which baggage can be practically stored, according to a shape of the rest of the space of storage space 101.

Figure 22:
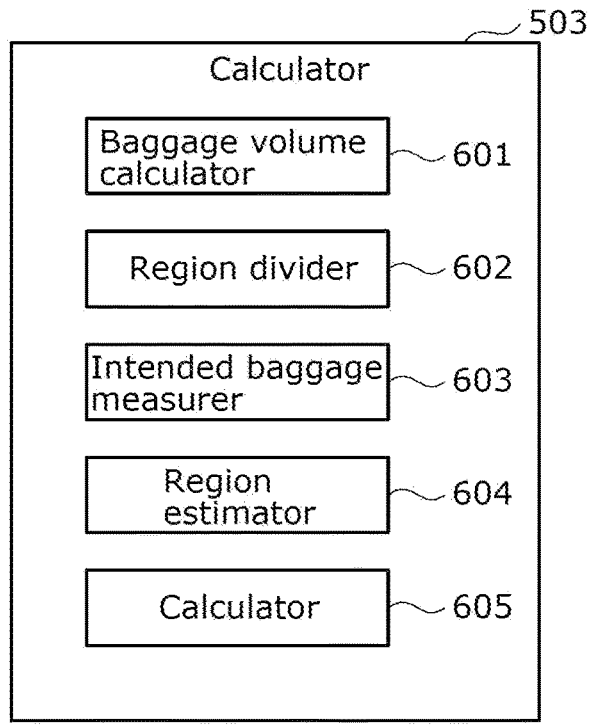
FIG. 22 is a block diagram illustrating an example of a configuration of a calculator of a filling rate calculator according to Variation 1.
Figure 23:
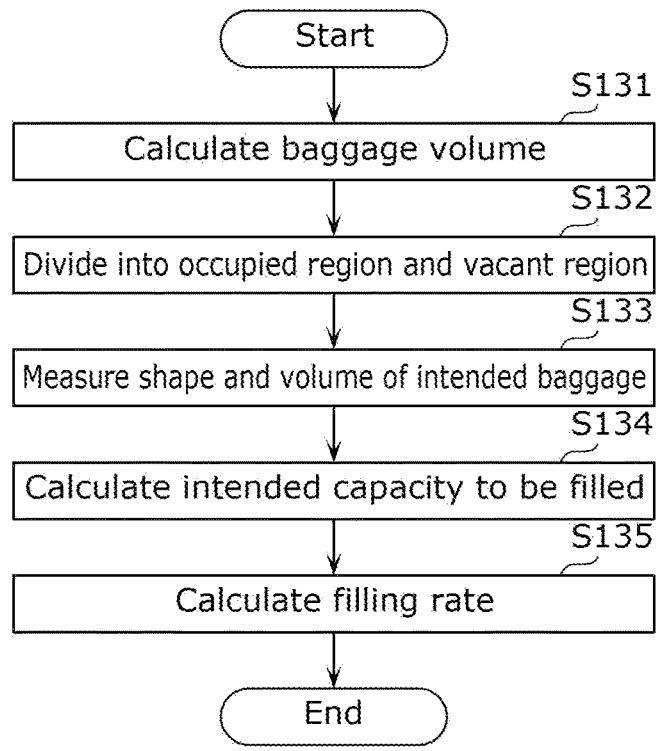
FIG. 23 is a flowchart of a filling rate calculating process by the calculator of the filling rate calculator according to Variation 1.

FIG. 22 is a block diagram illustrating an example of a configuration of a calculator of a filling rate calculator according to Variation 1. FIG. 23 is a flowchart of a filling rate calculating process by the calculator of the filling rate calculator according to Variation 1.

As illustrated in FIG. 22, calculator 503 includes baggage volume calculator 601, region divider 602, intended baggage measurer 603, region estimator 604, and calculator 605.

Baggage volume calculator 601 calculates a baggage volume, which is a volume of baggage 103, from baggage model 2034 (S131). Baggage volume calculator 601 calculates the volume of baggage 103 stored in storage space 101 by the same method as in the embodiment.

Next, region divider 602 divides storage space 101 in the space three-dimensional model 2011 into occupied region 2041 that is occupied by baggage 103 and vacant region 2042 that is not occupied by baggage 103 (S132).

Next, intended baggage measurer 603 calculates a volume of one piece of baggage that is intended to be stored (S133). In a case where pieces of baggage intended to be stored are of types in shape and size as illustrated in (c) of FIG. 21, intended baggage measurer 603 calculates a volume of one piece of baggage based on its type. For example, intended baggage measurer 603 calculates a volume of a piece of baggage 103a, a volume of a piece of baggage 103b, and a volume of a piece of baggage 103c.

Next, region estimator 604 estimates a disposing method that enables pieces of baggage 103 intended to be stored the most in vacant region 2042 and estimates the number of pieces of baggage 103 intended to be stored in this case. That is, region estimator 604 estimates a maximum number of storable pieces of baggage 103 intended to be stored in vacant region 2042. Region estimator 604 calculates a capacity of vacant region 2042 capable of storing baggage by multiplying the volume of one piece of baggage by the number of storable pieces of baggage (S134).

In a case where there are types of baggage, region estimator 604 may estimate the number of pieces of baggage that can be stored for each type or may estimate the numbers of pieces of baggage of the types in combination. In a case where pieces of baggage of the types are stored in combination, region estimator 604 calculates an integrated value of a capacity obtained by multiplying a volume of one piece of baggage of each type by the number of storable pieces of baggage of the type, as a capacity of vacant region 2042 capable of storing baggage. For example, when estimating that number n1 of pieces of baggage 103a, number n2 of pieces of baggage 103b, and number n3 of pieces of baggage 103c are storable, region estimator 604 calculates an integrated value of a first volume resulting from multiplying a volume of a piece of baggage 103a by n1, a second volume resulting from multiplying a volume of a piece of baggage 103b by n2, and a third volume resulting from multiplying a volume of a piece of baggage 103c by n3, as the capacity of vacant region 2042 capable of storing baggage. It should be noted that n1, n2, and n3 are each an integer larger than or equal to zero.

Calculator 605 calculates the filling rate by substituting the volume of baggage already stored and the capacity capable of storing baggage into Equation 2 shown below (S135).

$$\text{filling rate (\%)} = \text{(volume of baggage already stored)} / \text{(volume of baggage already stored} + \text{capacity capable of storing baggage)} \times 100 \quad (2)$$

As seen from the above, filling rate calculator 224 may calculate the proportion of the volume of baggage 103 stored in storage space 101 with respect to the capacity of an available space for storing baggage 103 in storage space 101, as the filling rate.

This enables the calculation of the first filling rate for appropriately determining how many pieces of baggage 103 can be stored in a vacant space of storage space 101.

Variation 2

Information processing device 220 according to the embodiment described above is configured to calculate the filling rate of baggage 103 with respect to storage space 101 of one rack 102, but a filling rate of baggage 103 with respect to storage spaces 101 of two or more racks 102.

Figures 24, 25:
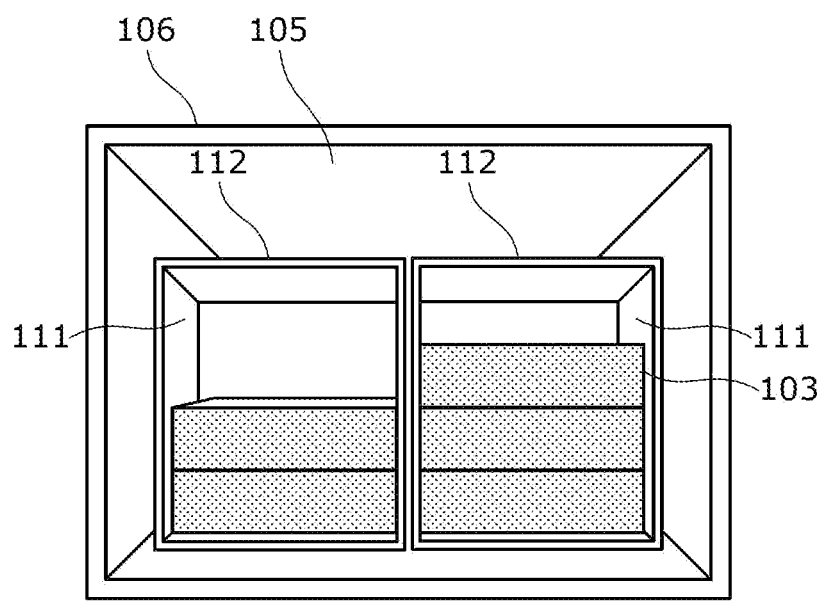
FIG. 24 is a diagram illustrating an example of a case where two or more racks are stored in a storage space such as a platform of a truck.
FIG. 25 is a table showing a relation between racks stored in a storage space on a platform and their filling rates.

FIG. 24 is a diagram illustrating an example of a case where two or more racks are stored in a storage space such as a platform of a truck. FIG. 25 is a table showing a relation between racks stored in the storage space on the platform and their filling rates.

As illustrated in FIG. 24, in platform 106 including storage space 105, cage carriages 112 are stored. Platform 106 may be a van-body type platform of a truck. Platform 106 is an example of a second storage. The second storage is not limited to platform 106 and may be a container or a storehouse.

Storage space 105 is an example of a second storage space. Storage space 105 has a capacity of a size that allows cage carriages 112 to be stored. In Variation 2, storage space 105 is capable of storing six cage carriages 112. Being capable of storing cage carriages 112, storage space 105 is larger than storage spaces 111.

Cage carriages 112 each have storage space 111 that is capable of storing pieces of baggage 103. Cage carriage 112 is an example of the first storage. Storage space 111 is an example of the first storage space. In storage space 105, rack 102 described in the embodiment may be stored.

The pieces of baggage 103 are not directly stored in platform 106 by stored in cage carriages 112. Cage carriages 112 storing the pieces of baggage 103 are stored in platform 106.

A configuration of calculator 503 of filling rate calculator 224 in this case will be described.

Figure 26:
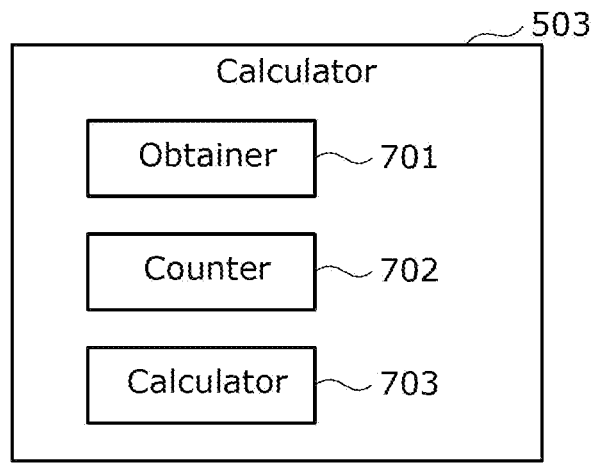
FIG. 26 is a block diagram illustrating an example of a configuration of a calculator of a filling rate calculator according to Variation 2.
Figure 27:
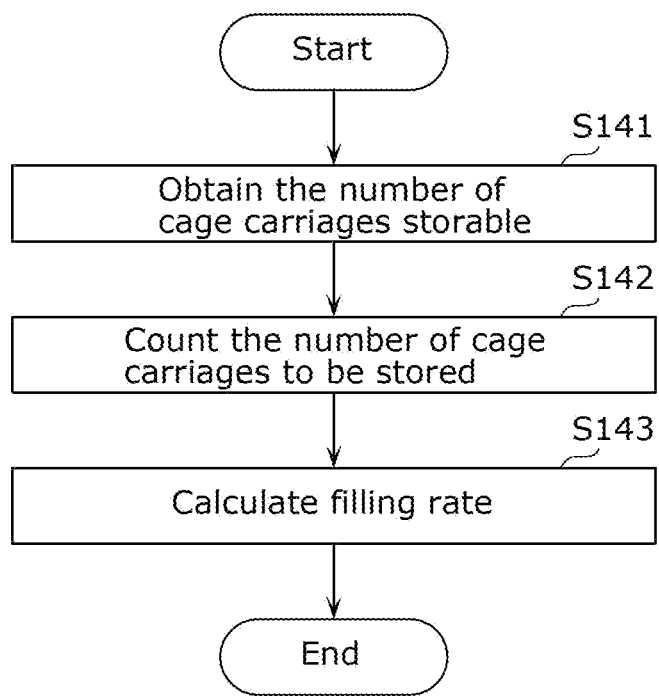
FIG. 27 is a flowchart of a filling rate calculating process by the calculator of the filling rate calculator according to Variation 2.

FIG. 26 is a block diagram illustrating an example of a configuration of a calculator of a filling rate calculator according to Variation 2. FIG. 27 is a flowchart of a filling rate calculating process by the calculator of the filling rate calculator according to Variation 2.

As illustrated in FIG. 26, calculator 503 according to Variation 2 includes obtainer 701, counter 702, and calculator 703.

Obtainer 701 obtains the number of cage carriages 112 that are storable in platform 106 (S141). In a case of Variation 2, a maximum number of cage carriages 112 storable in platform 106 is six, and thus obtainer 701 obtains six.

Counter 702 counts the number of cage carriages 112 to be stored in platform 106 (S142). In a case where cage carriages 112 illustrated in FIG. 24 are stored in platform 106, counter 702 takes three as the count of the number of cage carriages 112.

Calculator 703 calculates a second filling rate, which is a filling rate of one or more cage carriages 112 with respect to platform 106 (S143). Specifically, calculator 703 may calculate, as the second filling rate, a proportion of the number of cage carriages 112 stored in platform 106 with respect to a maximum number of cage carriages 112 storable in platform 106. For example, up to six cage carriages 112 are storable in platform 106, and three cage carriages 112 out of six are stored in platform 106, and thus calculator 703 calculates 50% as the second filling rate.

It should be noted that calculator 703 may calculate a filling rate of baggage 103 with respect to each of one or more cage carriages 112 stored in platform 106 and calculate, using the calculated filling rate, a filling rate of baggage 103 with respect to second storage space. Specifically, calculator 703 may calculate an average of filling rates of baggage 103 with respect to cage carriages 112 as the filling rate of baggage 103 with respect to the second storage space. In this case, when there is a remaining available space for storing cage carriages 112 in storage space 105 of platform 106, calculator 703 may calculate the average assuming that a filling rate of cage carriages 112 of the number of cage carriages 112 storable in the remaining space capable of storing cage carriages 112 is 0%.

For example, in a case where filling rates of three cage carriages 112 illustrated in FIG. 25 are 70%, 30%, and 20%, and six cage carriages 112 are storable in platform 106 at the maximum, filling rates of the six cage carriages 112 may be given as 70%, 30%, 20%, 0%, 0%, and 0%, and a result of determining their average, 20%, may be calculated as the filling rate of baggage 103 with respect to the second storage space. This enables the second filling rate in a case where one or more cage carriages 112 are stored in storage space 105 to be calculated appropriately.

Variation 3

Next, Variation 3 will be described.

Figure 28:
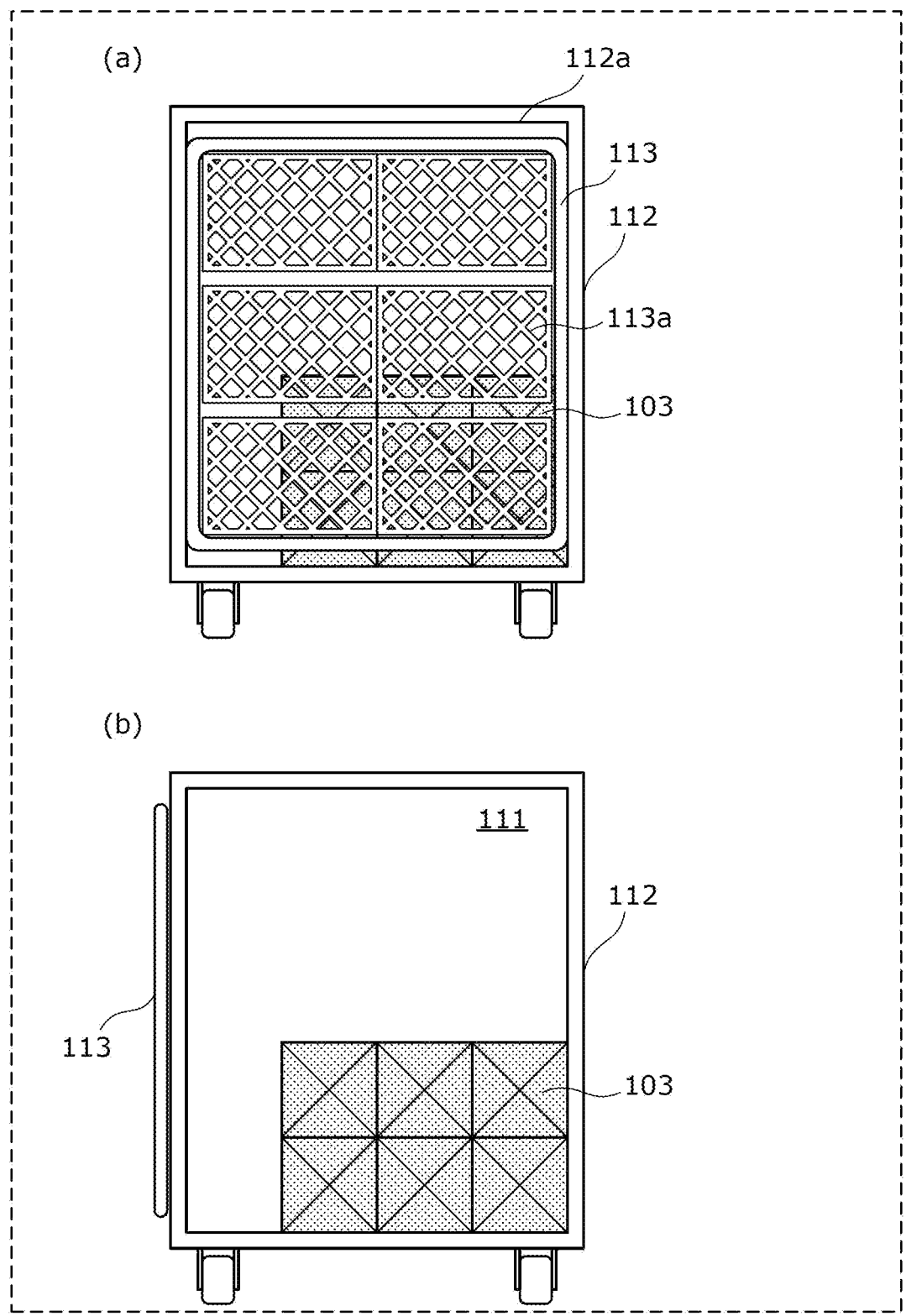
FIG. 28 is a diagram for describing a configuration of a cage carriage according to Variation 3.

FIG. 28 is a diagram for describing a configuration of a cage carriage according to Variation 3.

In FIG. 28, (a) is a diagram illustrating cage carriage 112 of which cover part 113 that is opened and closed is in a closed state. In FIG. 28, (b) is a diagram illustrating cage carriage 112 of which cover part 113 is in an open state.

Cage carriage 112 according to Variation 3 includes cover part 113 that opens and closes opening 112a. Cover part 113 is a lattice-like or mesh-like cover having through holes 113a. Therefore, even when cover part 113 of cage carriage 112 is in the closed state, range sensor 210 can measure a three-dimensional shape of an inside of storage space 111 of cage carriage 112 via through holes 113a and opening 112a.

This is because electromagnetic waves emitted by range sensor 210 pass through through holes 113a and opening 112a. It should be noted that, in a case of range sensor 210A, an infrared pattern emitted by range sensor 210A passes through through holes 113a and opening 112a, and thus, even when cover part 113 of cage carriage 112 is in the closed state, the three-dimensional shape of the inside of storage space 111 of cage carriage 112 can be measured via through holes 113a and opening 112a. Further, in a case of range sensor 210B, two cameras 211B and 212B are capable of imaging the inside of storage space 111 via through holes 113a and opening 112a, and thus the three-dimensional shape of the inside of storage space 111 of cage carriage 112 can be measured.

Information processing device 220 therefore can determine whether baggage 103 is stored in storage space 111. However, it is difficult to calculate a correct filling rate unless a method of calculating a filling rate is switched to another method between a case where cover part 113 is in the closed state and a case where cover part 113 is in the open state or a case where cover part 113 is not provided. Thus, filling rate calculator 224 according to Variation 3 calculates a filling rate by a first method when cover part 113 is in the open state and calculates a filling rate by a second method when cover part 113 is in the closed state.

Figure 29:
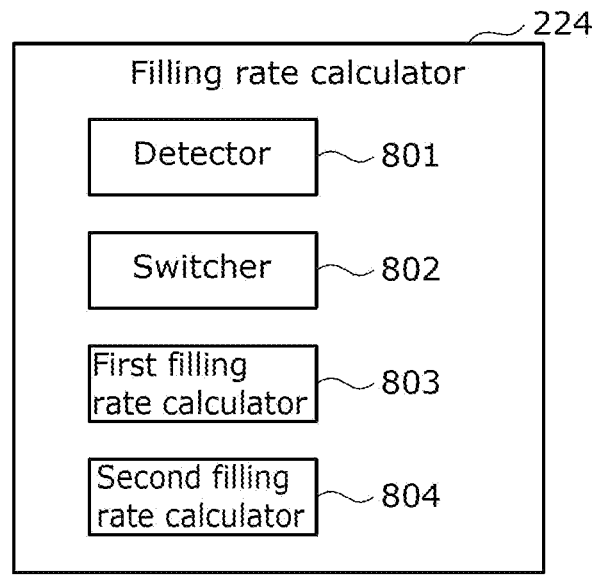
FIG. 29 is a block diagram illustrating an example of a configuration of a filling rate calculator according to Variation 3.
Figure 30:
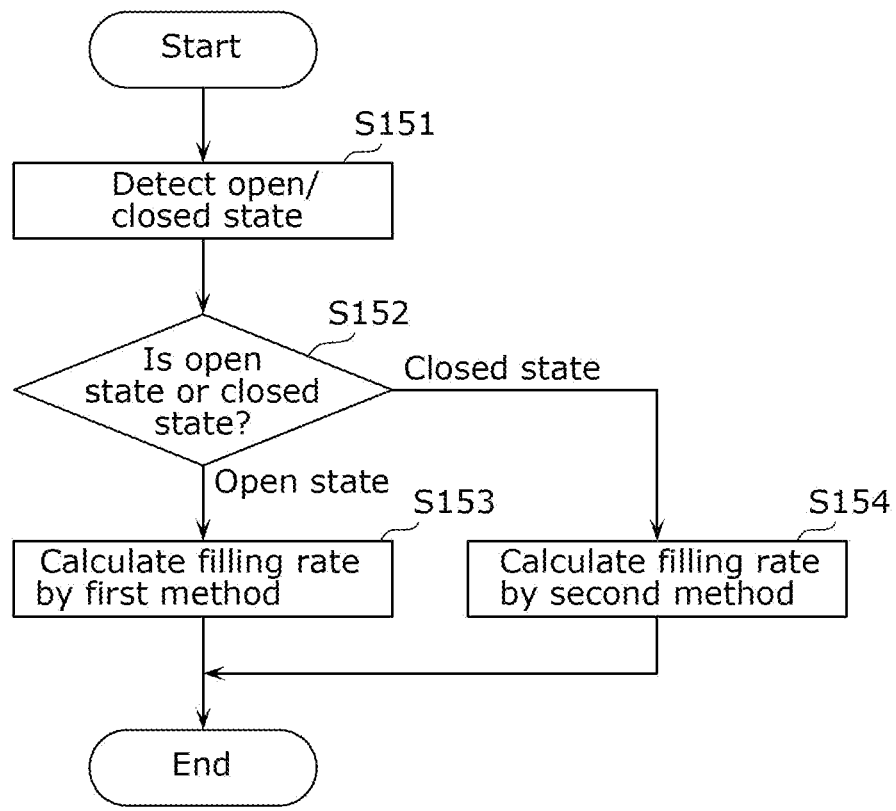
FIG. 30 is a flowchart of a filling rate calculating process by the filling rate calculator according to Variation 3.

FIG. 29 is a block diagram illustrating an example of a configuration of a filling rate calculator according to Variation 3. FIG. 30 is a flowchart of a filling rate calculating process by the filling rate calculator according to Variation 3.

As illustrated in FIG. 29, filling rate calculator 224 according to Variation 3 includes detector 801, switcher 802, first filling rate calculator 803, and second filling rate calculator 804.

Detector 801 detects an open/closed state of cover part 113 using a space three-dimensional model (S151). Specifically, using the space three-dimensional model, detector 801 detects that cover part 113 is in the closed state when three-dimensional point clouds are present at positions inside and outside storage space 111 in a front-back direction of a region of opening 112a of cage carriage 112 (i.e., a direction in which range sensor 210 and cage carriage 112 are arranged). When a three-dimensional point cloud is present only inside storage space 111, detector 801 detects that cover part 113 is in the open state.

Switcher 802 determines whether cover part 113 is in the open state or the closed state (S152), and switches between the following processes according to a result of the determination.

When cover part 113 is determined to be in the open state by switcher 802 (Open state in S152), first filling rate calculator 803 calculates a filling rate by the first method (S153). Specifically, first filling rate calculator 803 calculates a filling rate of cage carriage 112 by performing the same process as the process by filling rate calculator 224 in the embodiment.

When cover part 113 is determined to be in the closed state by switcher 802 (Closed state in S152), second filling rate calculator 804 calculates a filling rate by the second method (S154). The second method will be described in detail with reference to FIG. 31.

Figure 31:
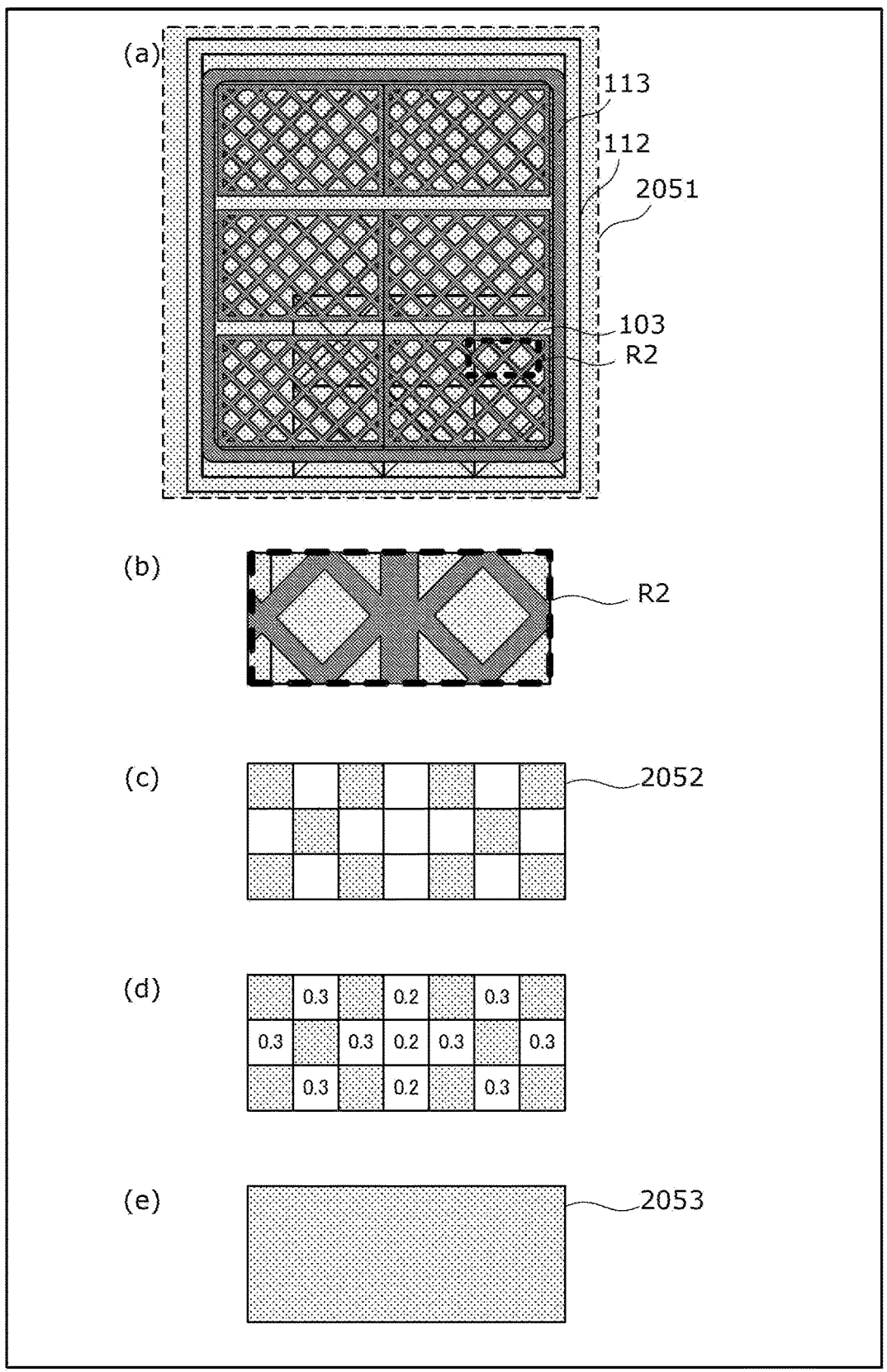
FIG. 31 is a diagram for describing an example of a second method for calculating a filling rate.

FIG. 31 is a diagram for describing an example of the second method for calculating a filling rate.

As illustrated in (a) of FIG. 31, consider a case where space three-dimensional model 2051 is obtained.

In FIG. 31, (b) is a diagram of region R2 in space three-dimensional model 2051 in an enlarged manner. As illustrated in (b) of FIG. 31, second filling rate calculator 804 classifies region R2 into a second portion where cover part 113 is detected and a first portion where baggage 103 is detected. The first portion is a region including a three-dimensional point cloud on a back side of a region of opening 112a. In addition, the first portion is a portion through which range sensor 210 faces baggage 103 in a direction from range sensor 210 to baggage 103. That is, the first portion is a portion that faces through holes 113a in cover part 113 in the closed state in the direction from range sensor 210 to baggage 103. It should be noted that cover part 113 may have a configuration having one through hole 113a. Further, the direction from range sensor 210 to baggage 103 may be horizontal, for example.

The second portion is a region including a three-dimensional point cloud on a front side of a region of opening 112a of cage carriage 112 in the front-back direction. In addition, the second portion is a portion through which range sensor 210 does not face baggage 103 in a direction from range sensor 210 to baggage 103. That is, the second portion is a portion that is hidden by cover part 113 in the closed state in the direction from range sensor 210 to baggage 103.

Second filling rate calculator 804 converts the first portion and the second portion into voxels, thus generating voxel data 2052 illustrated in (c) of FIG. 31. In voxel data 2052, white regions not hatched are regions where the second portion has been converted into voxels, and dot-hatched regions are regions where the first portion has been converted into voxels.

On the white regions corresponding to regions of cover part 113, second filling rate calculator 804 then estimates whether baggage 103 is present on the back side of cover part 113. Specifically, in regions where the conversion into voxels has been carried out, second filling rate calculator 804 assigns a score based on a probability that the baggage is present to each of 26 voxels adjacent to a dot-hatched voxel, where baggage 103 is present. Then, as illustrated in (d) of FIG. 31, additional scores are assigned to voxels illustrated as white regions adjacent to voxels where baggage 103 is present. Second filling rate calculator 804 performs this on all voxels where baggage 103 is present and determines that baggage 103 is present in voxels illustrated as white regions each of which has a total value of the scores being greater than or equal to a given threshold value. For example, when the given threshold value is assumed to be 0.1, second filling rate calculator 804 determines that baggage 103 is present in all the regions, and thus, as illustrated in (e) of FIG. 31, baggage model 2053 into which a shape of a region concealed by cover part 113 is estimated can be calculated.

In this manner, information processing device 220 estimates a shape of the second portion through which range sensor 210 does not face a measurement target based on a shape of the first portion through which the range sensor faces baggage 103, and thus, even in a case where the second portion is present, a target three-dimensional model can be estimated appropriately.

Figure 32:
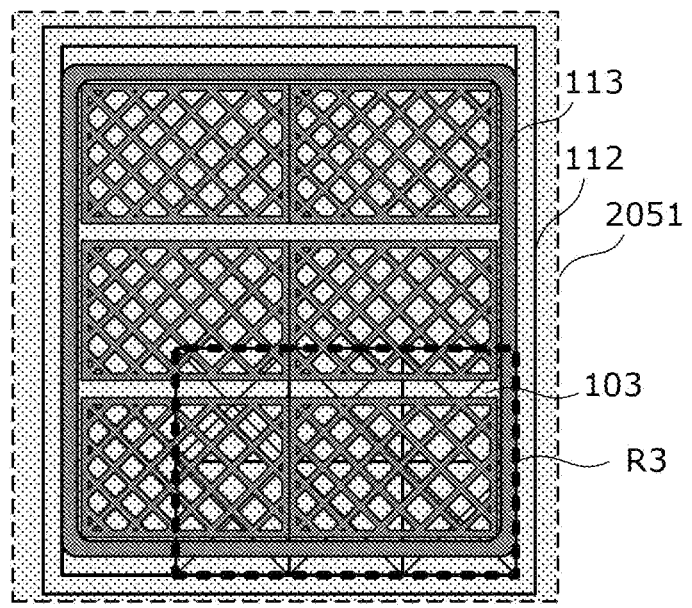
FIG. 32 is a diagram for describing another example of a second method for calculating a filling rate.

In a case where there is a rule that pieces of baggage 103 are to be closely disposed inside cage carriage 112, second filling rate calculator 804 may extract, as illustrated in FIG. 32, contour R3 of a region where one or more pieces of baggage 103 are disposed and may determine that pieces of baggage 103 are present inside extracted contour R3. Then, second filling rate calculator 804 may estimate a region of cover part 113 inside contour R3 using a three-dimensional point cloud in a region of through holes 113a of cover part 113.

In a filling rate measurement method according to Variation 3, cage carriage 112 further has through holes 113a and cover part 113 that opens and closes opening 112a. Further, in the filling rate measurement method, whether cover part 113 is in the open state or in the closed state is determined, and when cover part 113 is in the open state, baggage model 2034 is estimated by extraction and estimation as filling rate calculator 224 in the embodiment does. When cover part 113 is in the closed state, filling rate calculator 224 estimates second portions hidden by cover part 113 based on first portions corresponding to through holes 113a of cover part 113 in voxel data 2031 based on space three-dimensional model 2011 and estimates baggage model 2034 using the first portions, the estimated second portions, and storage three-dimensional model 2032.

According to this, even in a case where pieces of baggage 103 are stored in cage carriage 112 provided with cover part 113 that opens and closes opening 112a, the method for estimating baggage model 2034 is switched between the first method and the second method according to the open/closed state of cover part 113, and thus a target three-dimensional model can be estimated appropriately.

Further, in the filling rate measurement method according to Variation 3, the direction from range sensor 210 to baggage 103 is horizontal. This eliminates a need to adjust a position of range sensor 210 so that measurement can be performed in a direction in which cover part 113 having through holes 113a is not present, and thus a flexibility of placing range sensor 210 is high. Therefore, a result of measurement for estimating a target three-dimensional model by range sensor 210 can be obtained even when the position of range sensor 210 is not adjusted completely.

Variation 4

Figure 33:
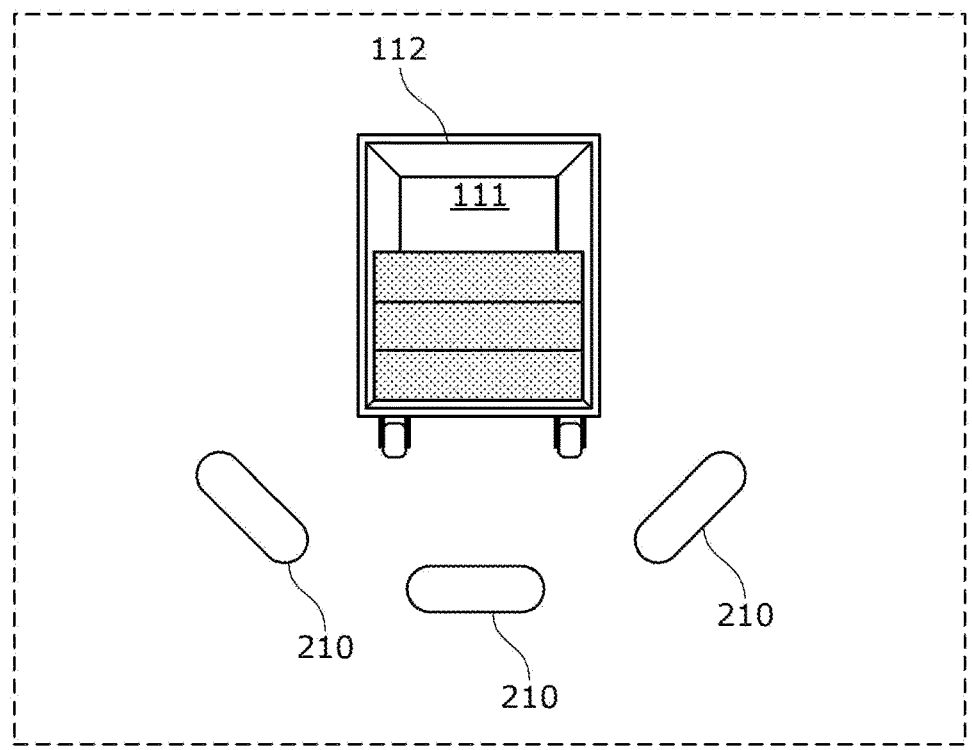
FIG. 33 is a diagram for describing a method for generating a space three-dimensional model according to Variation 4.

FIG. 33 is a diagram for describing a method for generating a space three-dimensional model according to Variation 4.

As illustrated in FIG. 33, in a case where a space three-dimensional model is generated, three-dimensional measurement system 200 may integrate results of measurement by range sensors 210 together as in the processing by model generator 223. In this case, three-dimensional measurement system 200 determines positions and orientations of range sensors 210 by performing calibration in advance and integrates obtained results of measurement together based on the determined positions and orientations of range sensors 210, so that a space three-dimensional model including a three-dimensional point cloud with little occlusion can be generated.

Variation 5

Figure 34:
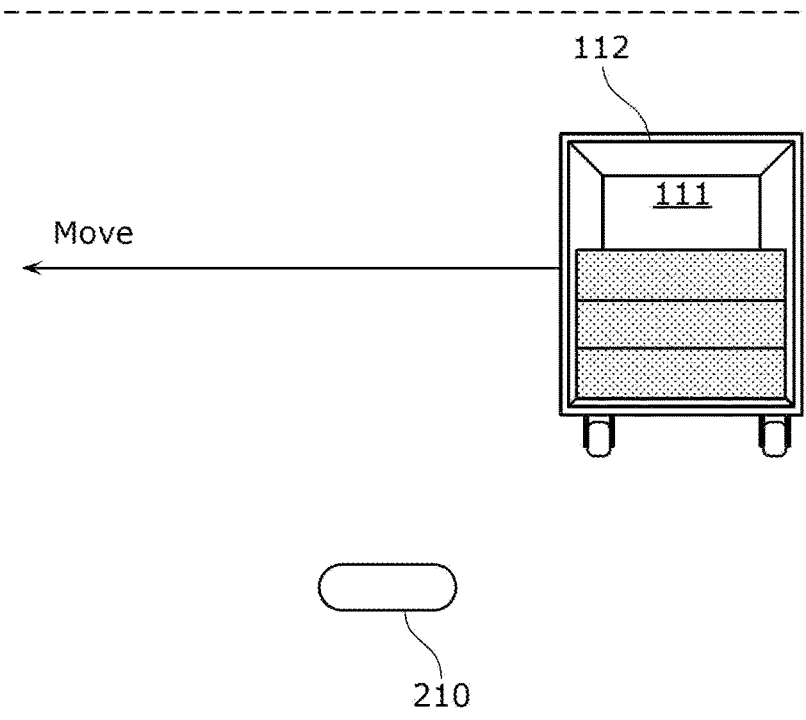
FIG. 34 is a diagram for describing a method for generating a space three-dimensional model according to Variation 5.

FIG. 34 is a diagram for describing a method for generating a space three-dimensional model according to Variation 5.

As illustrated in FIG. 34, in a case where a space three-dimensional model is generated, three-dimensional measurement system 200 may cause at least one of cage carriage 112 and one range sensor 210 to move in such a manner as to traverse measurement region R1 of one range sensor 210, and results of measurement obtained by range sensor 210 at timings during the movement may be integrated together. In this case, a relative position and a relative orientation between cage carriage 112 and one range sensor 210 are calculated, and results of measurement are integrated together using the relative position and the relative orientation, so that a space three-dimensional model including a three-dimensional point cloud with little occlusion can be generated.

Other Variations

Although the filing rate measurement method and the like according to the present disclosure have been described based on the above embodiments, the present disclosure is not limited to the embodiments.

For example, in the above embodiments, each processing unit included in the information processing device is implemented to a CPU and a control program. For example, the constituent elements of each processing unit may be implemented to one or more electronic circuits. Each of the one or more electronic circuits may be a general-purpose circuit or a dedicated circuit. The one or more electronic circuits may include, for example, an Integrated Circuit (IC), a Large Scale Integration (LSI), and the like. The IC or LSI may be integrated to a single chip or integrated to a plurality of chips. Here, the terminology "LSI" or "IC" is used, but depending on the degree of integration, the circuit may also be referred to as a system LSI, a Very Large Scale Integration (VLSI), or an Ultra Large Scale Integration (ULSI). A Field Programmable Gate Array (FPGA) that is programed after manufacturing the LSI may be used for the same purpose.

It should be noted that general or specific aspects of the present disclosure may be implemented to a system, a device, a method, an integrated circuit, or a computer program. The general or specific aspects of the present disclosure may be implemented to a non-transitory computer-readable recording medium such as an optical disk, a Hard Disk Drive (HDD), or a semiconductor memory, on which the computer program is recorded. Furthermore, the general or specific aspects of the present disclosure may be implemented to any combination of the system, the device, the method, the integrated circuit, or the computer program.

In addition, the present disclosure may include embodiments obtained by making various modifications on the above embodiments which those skilled in the art will arrive at, or embodiments obtained by selectively combining the elements and functions disclosed in the above embodiments, without materially departing from the scope of the present disclosure.

INDUSTRIAL APPLICABILITY

The present disclosure is useful as a filling rate measurement method, an information processing device, and a recording medium that are capable of calculating a filling rate of a measurement target.

The invention claimed is:

1. A filling rate measurement method comprising:
    obtaining a space three-dimensional model generated by measuring a first storage having an opening and a first storage space in which a measurement target is to be stored, the measuring being performed through the opening using a range sensor facing the first storage;
    obtaining a storage three-dimensional model that is a three-dimensional model of the first storage in which the measurement target is not stored;
    extracting a target portion corresponding to the measurement target from the space three-dimensional model using the space three-dimensional model obtained and the storage three-dimensional model obtained;
    calculating a first three-dimensional coordinate system by determining an origin thereof to be a point on a shape of the opening of the first storage;
    estimating a target three-dimensional model using the target portion extracted and the first three-dimensional coordinate system calculated, the target three-dimensional model being a three-dimensional model of the measurement target in the first storage space; and
    calculating a first filling rate of the measurement target with respect to the first storage space, using the storage three-dimensional model and the target three-dimensional model.

2. The filling rate measurement method according to claim 1, wherein
    the estimating of the target three-dimensional model is performed, based on a first three-dimensional coordinate system based on a position of a marker provided to the first storage.

3. The filling rate measurement method according to claim 1, wherein
    the estimating of the target three-dimensional model is performed by estimating a shape of a second portion of the measurement target which does not face the range sensor in a direction from the range sensor toward the measurement target, based on a shape of a first portion of the measurement target which faces the range sensor in the direction.

4. The filling rate measurement method according to claim 3, wherein
    the first storage further includes a cover part including a through hole, the cover part being opened and closed, and covering the opening when the cover part is in a closed state,
    the first portion faces, in the direction, the through hole of the cover part in the closed state, the second portion is hidden in the direction by the cover part in the closed state, the filling rate measurement method further comprises determining whether the cover part is in an open state or the closed state, when the cover part is in the open state, the extracting and the estimating of the target three-dimensional model are performed to estimate the target three-dimensional model, and when the cover part is in the closed state, the second portion is estimated based on the first portion, and the target three-dimensional model is estimated using the first portion, the second portion estimated, and the storage three-dimensional model.

5. The filling rate measurement method according claim 4, wherein
the direction is horizontal.

6. The filling rate measurement method according to claim 1, wherein
the calculating of the first filling rate is performed by calculating, as the first filling rate, a proportion of a volume of the measurement target stored in the first storage space to a capacity of an available space for storing the measurement target in the first storage space.

7. The filling rate measurement method according to claim 1, wherein
the first storage and an additional first storage are stored in a second storage space included in a second storage, and
the filling rate measurement method further comprises
calculating a second filling rate of the first storage and the additional first storage with respect to the second storage space.

8. The filling rate measurement method according to claim 1, wherein
the storage three-dimensional model is a three-dimensional model measured by the range sensor and an additional range sensor.

9. The filling rate measurement method according to claim 1, wherein
the range sensor includes at least two cameras for generating the space three-dimensional model and is fixed to a position above the first storage.

10. An information processing device comprising:
a processor; and
a memory,
wherein, using the memory, the processor:
obtains a space three-dimensional model generated by measuring a first storage having an opening and a first storage space in which a measurement target is to be stored, the measuring being performed through the opening using a range sensor facing the first storage;
obtains a storage three-dimensional model that is a three-dimensional model of the first storage in which the measurement target is not stored;
extracts a target portion corresponding to the measurement target from the space three-dimensional model using the space three-dimensional model obtained and the storage three-dimensional model obtained;
calculates a first three-dimensional coordinate system by determining an origin thereof to be a point on a shape of the opening of the first storage;
estimates a target three-dimensional model using the target portion extracted and the first three-dimensional coordinate system calculated, the target three-dimensional model being a three-dimensional model of the measurement target in the first storage space; and
calculates a first filling rate of the measurement target with respect to the first storage space, using the storage three-dimensional model and the target three-dimensional model.

11. A non-transitory computer-readable recording medium having recorded thereon a program causing a computer to perform a filling rate measurement method, the filling rate measurement method including:
obtaining a space three-dimensional model generated by measuring a first storage having an opening and a first storage space in which a measurement target is to be stored, the measuring being performed through the opening using a range sensor facing the first storage;
obtaining a storage three-dimensional model that is a three-dimensional model of the first storage in which the measurement target is not stored;
extracting a target portion corresponding to the measurement target from the space three-dimensional model using the space three-dimensional model obtained and the storage three-dimensional model obtained;
calculating a first three-dimensional coordinate system by determining an origin thereof to be a point on a shape of the opening of the first storage;
estimating a target three-dimensional model using the target portion extracted and the first three-dimensional coordinate system calculated, the target three-dimensional model being a three-dimensional model of the measurement target in the first storage space; and
calculating a first filling rate of the measurement target with respect to the first storage space, using the storage three-dimensional model and the target three-dimensional model.

* * * * *